(12) United States Patent
Abe

(10) Patent No.: US 10,416,411 B2
(45) Date of Patent: Sep. 17, 2019

(54) OPTICAL APPARATUS

(71) Applicant: CANON KABUSHIKI KAISHA, Tokyo (JP)

(72) Inventor: Ryo Abe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 376 days.

(21) Appl. No.: 15/298,509

(22) Filed: Oct. 20, 2016

(65) Prior Publication Data

US 2017/0115465 A1    Apr. 27, 2017

(30) Foreign Application Priority Data

Oct. 26, 2015   (JP) ................ 2015-209665

(51) Int. Cl.
| | |
|---|---|
| *G02B 7/02* | (2006.01) |
| *G02B 7/00* | (2006.01) |
| *G02B 15/14* | (2006.01) |
| *H04N 5/228* | (2006.01) |
| *G03B 17/00* | (2006.01) |
| *G02B 7/08* | (2006.01) |
| *H02K 41/035* | (2006.01) |

(52) U.S. Cl.
CPC ........... *G02B 7/08* (2013.01); *H02K 41/0356* (2013.01)

(58) Field of Classification Search
CPC .......... G02B 7/08; G02B 7/021; G02B 7/023; G02B 7/04; G02B 7/026; G03B 5/00; H04N 5/23248; G11B 7/0935; G11B 7/0932

USPC ................ 359/811–830, 694, 554, 701, 704; 348/208.99, 208.7; 396/55
See application file for complete search history.

(56) References Cited

U.S. PATENT DOCUMENTS

| | | | |
|---|---|---|---|
| 8,928,990 B2 * | 1/2015 | Nakayama | ............. H04N 5/222 359/557 |
| 2010/0182696 A1 * | 7/2010 | Hasegawa | ............ G02B 27/646 359/557 |

FOREIGN PATENT DOCUMENTS

JP           2000-019577 A       1/2000

* cited by examiner

*Primary Examiner* — Dawayne Pinkney
(74) *Attorney, Agent, or Firm* — Cowan, Liebowitz & Latman, P.C.

(57) ABSTRACT

The optical apparatus includes, as actuators to move a movable member in a first direction, a first coil and a second coil provided to a base member or the movable member, and a first magnet and a second magnet provided to the movable member or the base member. The first magnet has a first surface facing the first coil, and the second magnet has a second surface facing the second coil. Each of the first and second surfaces has thereon N- and S-pole portions arranged in the first direction. In a state where the movable member is located at a center of its movable range, center positions of the first and second coils have differences from boundary positions of the N- and S-pole portions of the first and second magnets.

7 Claims, 15 Drawing Sheets

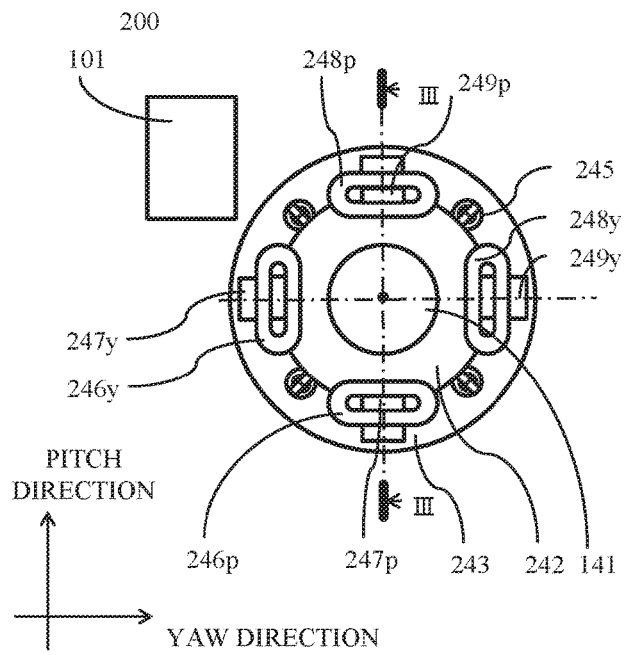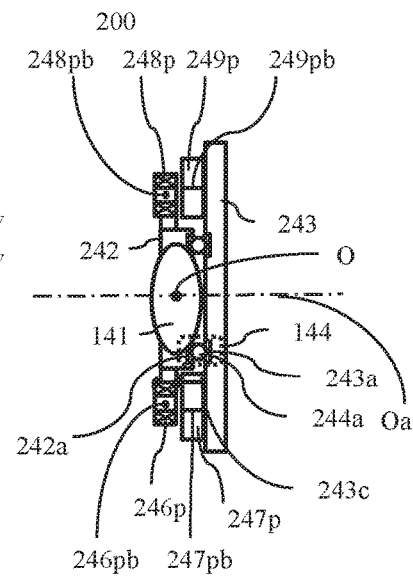
FIG. 11A  FIG. 11B
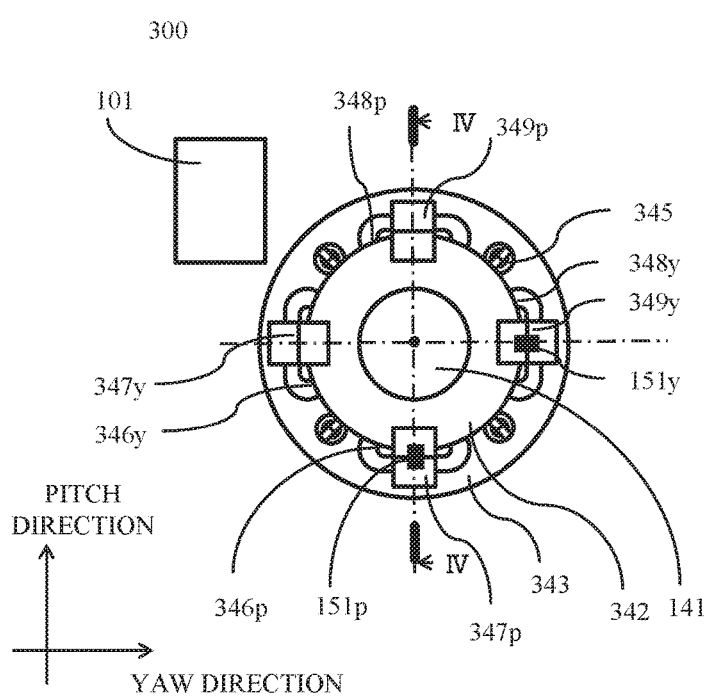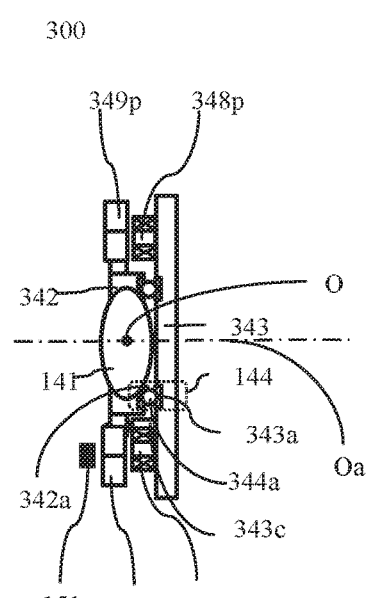
FIG. 12A  FIG. 12B

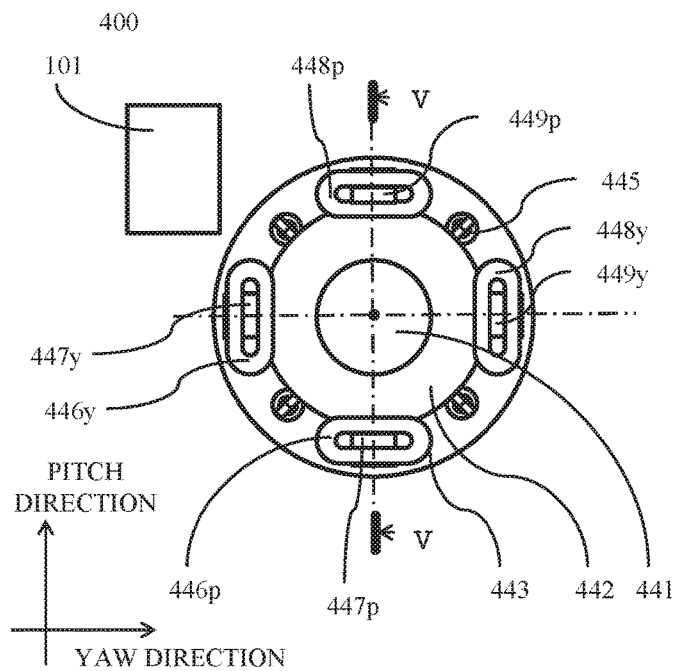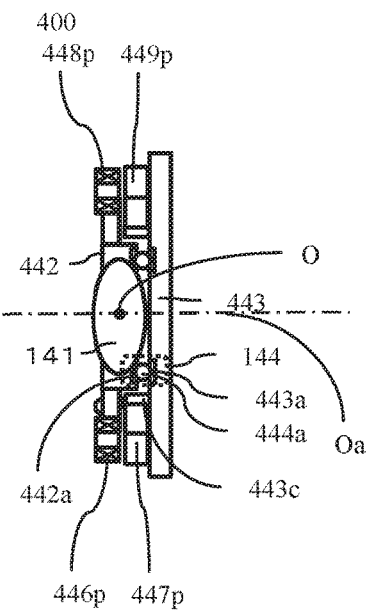
FIG. 13A  FIG. 13B
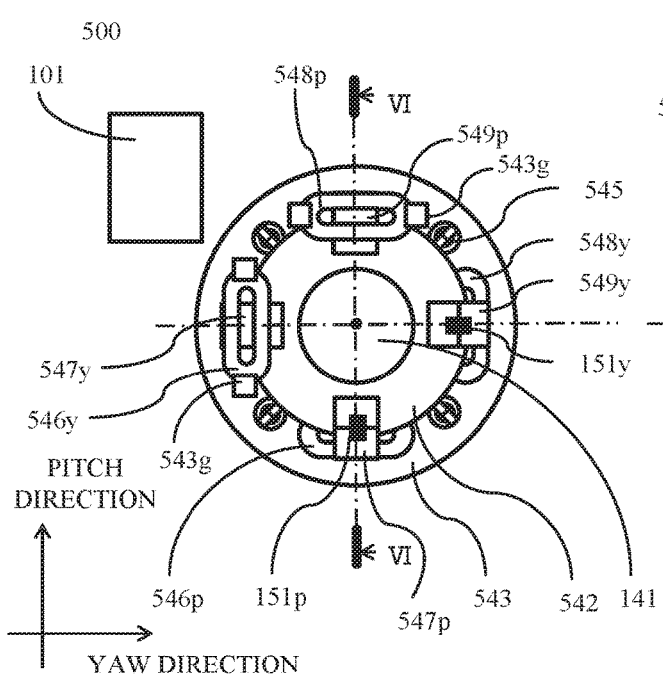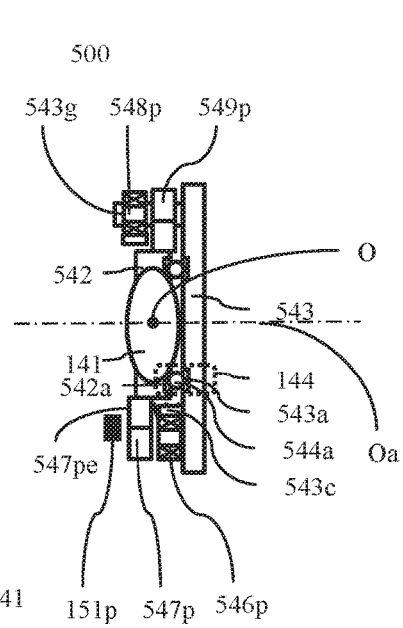
FIG. 14A  FIG. 14B

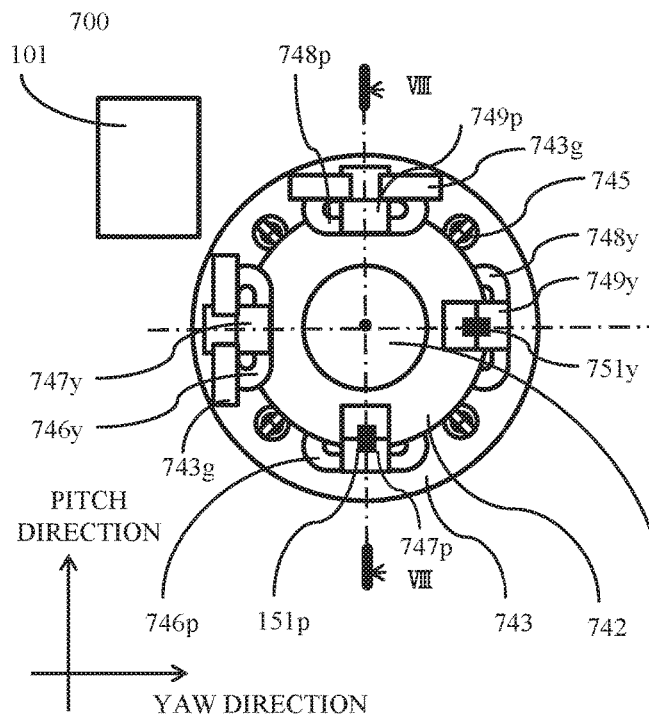
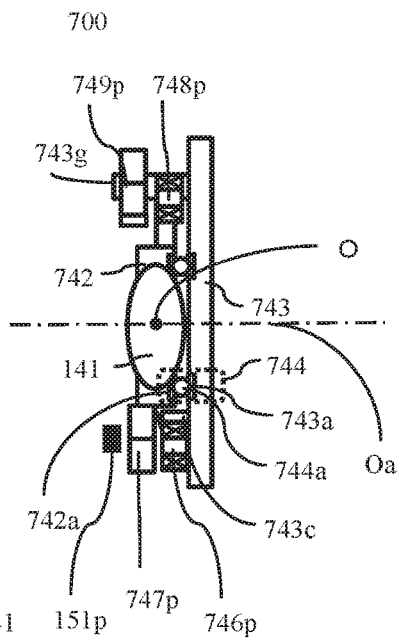
FIG. 17A  FIG. 17B
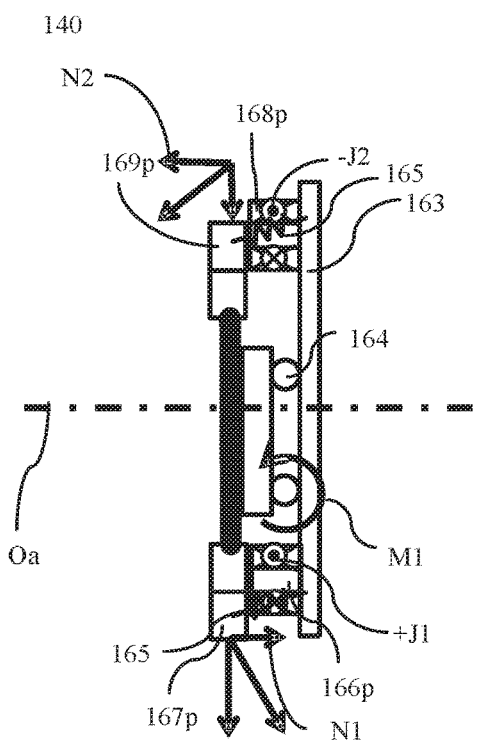
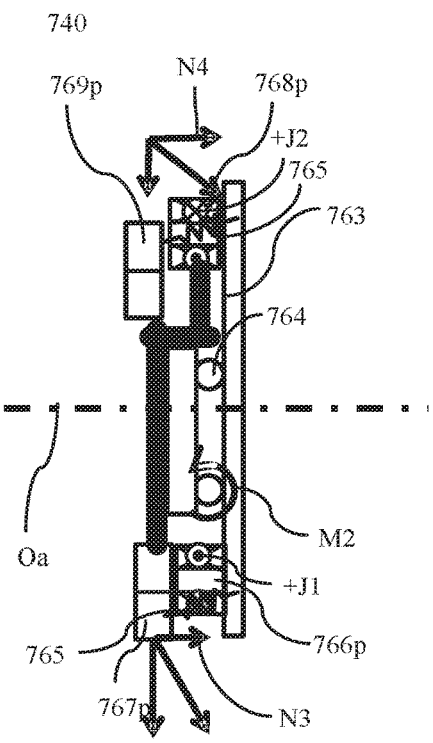
FIG. 18A  FIG. 18B

OPTICAL APPARATUS

BACKGROUND OF THE INVENTION

Field of the Invention

The present invention relates to optical apparatuses such as digital cameras and interchangeable lenses.

Description of the Related Art

Optical apparatuses used for image capturing each use a shiftable element, such as an optical element included in an optical system or an image sensor, for optical image stabilization that shifts the shiftable element with respect to an optical axis to reduce a blur of an optical image formed on an imaging plane of the image sensor due to shaking of the optical apparatus (such as camera shaking). Such optical apparatuses are required to be capable of shifting the shiftable element by a large shift amount so as to be able to reduce a large image blur due to a large camera shaking.

Japanese Patent Laid-Open No. 2000-019577 discloses an optical apparatus using a voice coil motor (VCM) as an actuator and providing a specific relation between widths of a coil and a magnet in a coil driving direction so as to be capable of shifting a shiftable element with a large shift amount.

In the optical apparatus disclosed in Japanese Patent Laid-Open No. 2000-019577, when viewed from an optical axis direction where an optical axis extends, a center of the coil and a center of the magnet overlap each other, and a movement of the coil with respect to the center of the magnet drives the shiftable element in its shift direction. In this case, when viewed from the optical axis direction, a thrust force in a shift direction becomes 0 when the center of the coil is located near a position at which a magnetic flux density of the magnet becomes its maximum. Therefore, in order to increase a shiftable range of the shiftable element, it is necessary to increase the widths of the magnet and coil.

However, an increase in the widths of the magnet and coils increases a diameter of the apparatus excessively with respect to an increase amount of the shiftable amount, thereby increasing a size of the apparatus.

SUMMARY OF THE INVENTION

The present invention provides an optical apparatus using a VCM as an actuator and being capable of increasing a movable amount of a movable member holding an optical element or an image sensor while reducing an increase in size of the apparatus.

The present invention provides as an aspect thereof an optical apparatus including a base member, a movable member holding a first element that is an optical element or an image sensor and being movable with respect to the base member in a first direction, a first actuator including a first coil and a first magnet, the first coil being provided to a first member that is one of the base and movable members, the first magnet being provided to a second member that is another one of the base and movable members, the first coil and the first magnet facing each other in a second direction orthogonal to the first direction, and a second actuator including a second coil and a second magnet, the second coil being provided to one of the first and second members, the second magnet being provided to another one of the first and second members, the second coil and the second magnet facing each other in the second direction. The first element is disposed between the first and second actuators. The first magnet has a first surface facing the first coil, and the second magnet has a second surface facing the second coil, each of the first and second surfaces having thereon an N-pole portion and an S-pole portion arranged in the first direction. The first and second actuators are configured to move the movable member in the first direction. In a first state where the movable member is located at a center of its movable range in the first direction, a center position of the first coil has a difference from a boundary position of the N-pole and S-pole portions of the first magnet, and a center position of the second coil has a difference from a boundary position of the N-pole and S-pole portions of the second magnet.

Further features and aspects of the present invention will become apparent from the following description of exemplary embodiments with reference to the attached drawings.

BRIEF DESCRIPTION OF THE DRAWINGS

FIGS. 11A and 11B are a front view and a sectional view of an optical image stabilizer that is Embodiment 2 of the present invention.

FIGS. 12A and 12B are a front view and a sectional view of an optical image stabilizer that is Embodiment 3 of the present invention.

FIGS. 13A and 13B are a front view and a sectional view of a modified example of the optical image stabilizer that is Embodiment 3 of the present invention.

FIGS. 14A and 14B are a front view and a sectional view of an optical image stabilizer that is Embodiment 4 of the present invention.

FIGS. 17A and 17B are a front view and a sectional view of an optical image stabilizer that is Embodiment 5 of the present invention.

FIGS. 18A and 18B are sectional views illustrating an operation of the optical image stabilizer of Embodiment 5.

DESCRIPTION OF THE EMBODIMENTS

Exemplary embodiments of the present invention will hereinafter be described with reference to the accompanying drawings.

[Embodiment 1]

Figure 1:
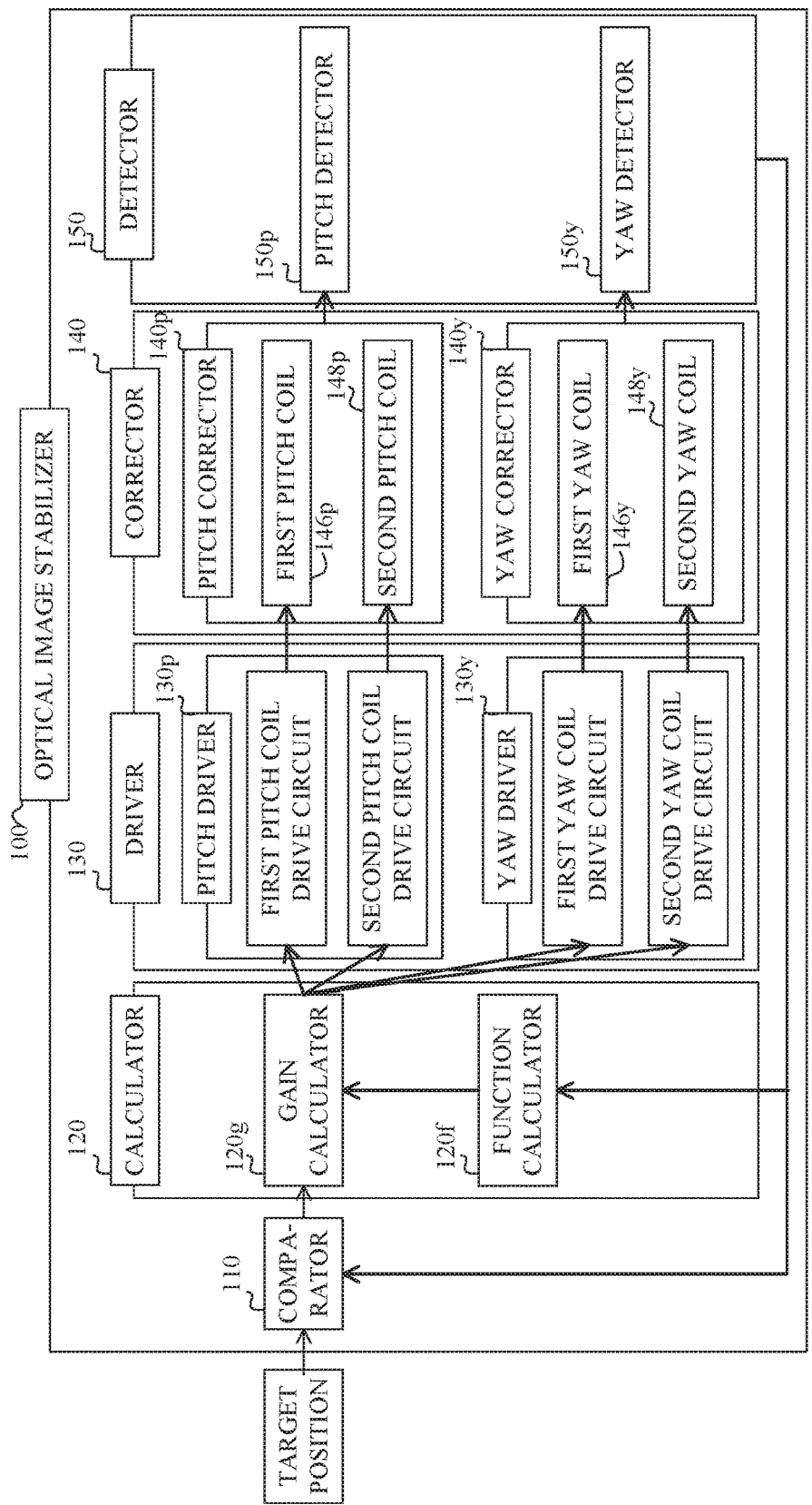
FIG. 1 is a block diagram illustrating a circuit configuration of an optical image stabilizer that is Embodiment 1 of the present invention.

FIG. 1 illustrates a circuit configuration of an optical image stabilizer 100 that is a first embodiment (Embodiment 1) of the present invention. The optical image stabilizer 100 of this embodiment is provided to optical apparatuses such as digital cameras and interchangeable lenses. The optical image stabilizer 100 includes a comparator 110, a calculator 120, a driver 130, a corrector 140 and a detector 150.

The comparator 110 configured to output a difference between a target position of a movable member 142, which will be described later, and a detected position thereof. The calculator 120 includes a gain calculator 120g configured to calculate a gain depending on an output from the comparator 110 and a function calculator 120f configured to calculate a ratio of electric current values to be applied to coils, which will be described later, depending on the detected position. The calculator 120 is configured to output the current values to be applied to the coils.

The driver 130 is configured to energize the coils depending on the electric current values output from the calculator 120. The driver 130 includes a pitch driver 130p configured to drive, through a first pitch coil drive circuit and a second pitch coil drive circuit, the movable member 142 in a pitch direction that is one of two shift directions each being a first direction. Furthermore, the driver 130 includes a yaw driver 130y configured to drive, through a first yaw coil drive circuit and a second yaw coil drive circuit, the movable member 142 in a yaw direction that is another one of the two shift directions.

The corrector 140 performs an image stabilizing operation in response to energization from the driver 130. The corrector 140 includes a pitch corrector 140p including a first pitch coil 146p and a second pitch coil 148p and includes a yaw corrector 140y including a first yaw coil 146y and a second yaw coil 148y. These coils constitute, together with magnets described later, voice coil motors (VCM) as actuators.

The detector 150 includes a pitch detector 150p and a yaw detector 150y and detects positions of the movable member 142 in the pitch direction and the yaw direction.

Figures 2A, 2B:
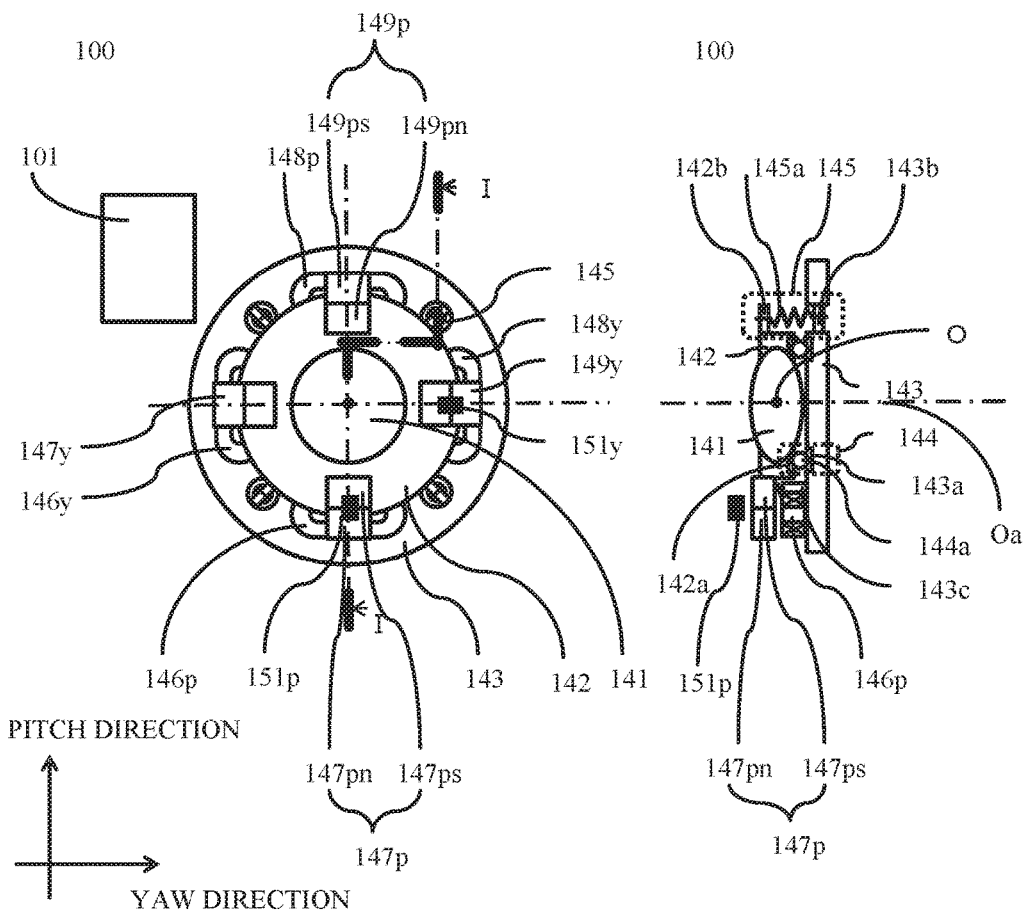
FIGS. 2A and 2B are a front view and a sectional view of the optical image stabilizer of Embodiment 1.
Figures 3A, 3B:
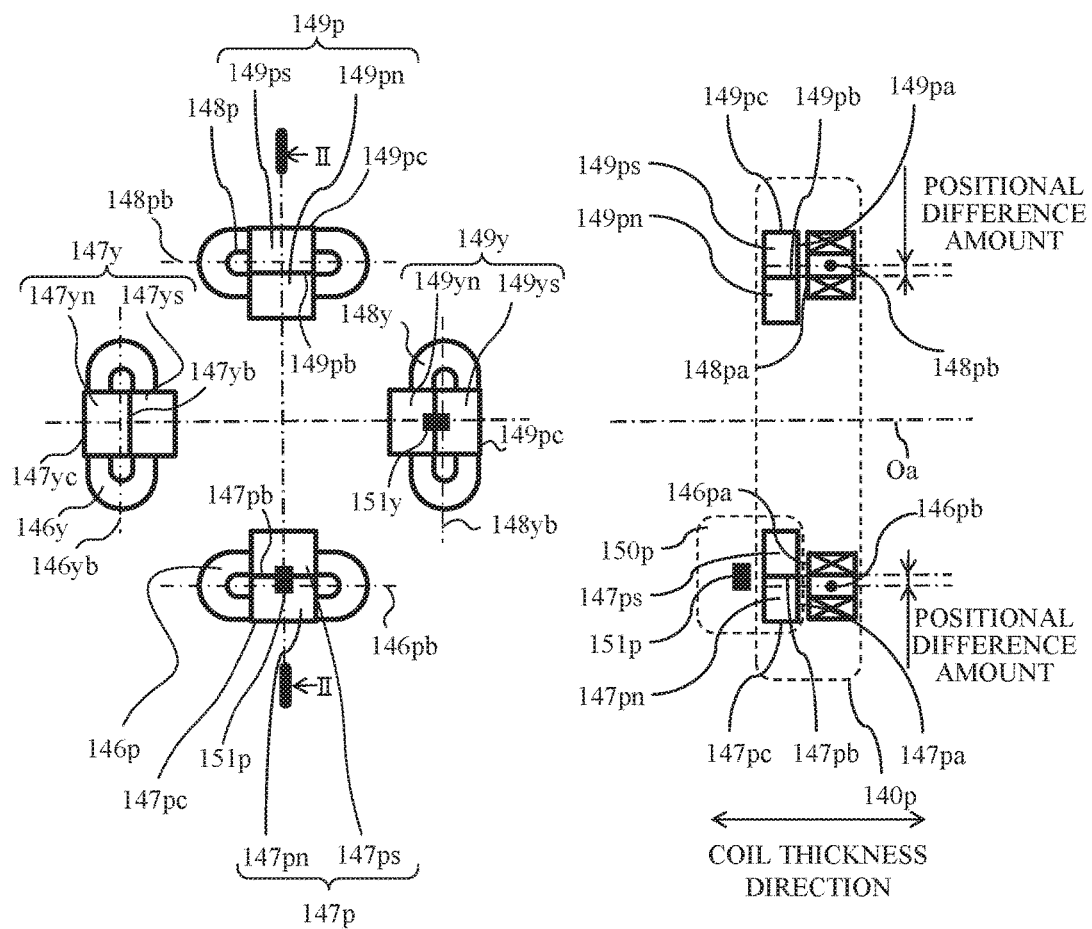
FIGS. 3A and 3B are a front view and a sectional view each illustrating a positional relation between coils and magnets of the optical image stabilizer of Embodiment 1.

FIGS. 2A and 2B illustrate a mechanical configuration of the optical image stabilizer 100. FIG. 2A illustrates a configuration of the optical image stabilizer 100 when viewed from an optical axis direction (described later), and FIG. 2B illustrates a section thereof along a I-I line in FIG. 2A. FIGS. 3A and 3B illustrate only the coils and magnets constituting the corrector 140 of the optical image stabilizer 100. FIG. 3A illustrates the coils and magnets when viewed from the optical axis direction. FIG. 3B illustrates a section thereof along a II-II line in FIG. 3A (that is, a section when viewed from the yaw direction).

An electrical substrate 101 illustrated in FIG. 2A is a circuit board including circuits for performing processes of the comparator 110, the calculator 120 and the driver 130. The first pitch coil 146p, the second pitch coil 148p, the first yaw coil 146y and the second yaw coil 148y, the pitch detector 150p and the yaw detector 150y are connected to the electrical substrate 101. Each of the first pitch coil 146p and the first yaw coil 146y corresponds to a first coil, and each of the second pitch coil 148p and the second yaw coil 148y corresponds to a second coil.

In FIG. 2A, an optical element 141 as a shiftable element constituted by a lens is moved (shifted), from a neutral state (first state) where the movable member 142 is located at a center of its movable range in the pitch and yaw directions, in a direction orthogonal to an optical axis Oa of the optical element 141. Shifting the optical element 141 in response to shaking of an optical apparatus due to hand jiggling or the like provides an image stabilization (image blur correction) effect that reduces blurring of an optical image formed by light passing through the optical element 141. The movement of the shiftable element may include not only a two-dimensional movement in a predetermined plane, but also a three-dimensional movement such as a rotation.

Although this embodiment uses the optical element 141 as the shiftable element that is a first element, an alternative embodiment may use as the shiftable element an image sensor such as a CMOS sensor that photoelectrically converts the object image.

The above-described optical axis direction as a second direction corresponds to a direction in which the optical axis Oa of the optical element 141 extends. The shift directions, that is, the pitch and yaw directions orthogonal to each other are directions orthogonal to the optical axis Oa (optical axis direction). In this embodiment, a side away from the center of the movable range in the shift direction is referred to "an outside", and a side close to the center is referred to as "an inside".

In FIG. 2A, the movable member 142 has at its central portion a cylindrical holding portion that holds the optical element 141. As illustrated in FIG. 2B, the movable member 142 has, at its three circumferential positions around the optical axis Oa on its ball-contact side surface where rollable balls 144a (described later) contact, ball-receiving portions 142a each having a planar surface shape orthogonal to the optical axis Oa. The movable member 142 further has spring hangers 142b at four circumferential positions on its outer circumferential portion. In FIG. 2A, a base member 143 is formed to have a discal shape and supports the movable member 142 movable in the shift directions via the rollable balls 144a. As illustrated in FIG. 2B, the base member 143 has, at its three circumferential positions on its movable member side surface, ball-receiving portions 143a each having a planar surface shape orthogonal to the optical axis Oa.

The base member 143 also has spring hangers 143b at four circumferential positions inside its outer circumferential portion and outside the ball-receiving portions 143a. The base member 143 further has, inside the outer circumferential portion and outside the ball-receiving portions 143a, a stopper portion 143c circumferentially extending in a ring shape. The movable member 142 shifting by a large amount and making contact with the stopper portion 143c is prevented from further shifting. The movable member 142 can shift in a range from a position on one side in each of the pitch and yaw directions until making contact with the stopper portion 143c to a position on another side in each of the pitch and yaw directions until making contact with the stopper portion 143c; this range is the movable range of the movable member 142.

Figure 4:
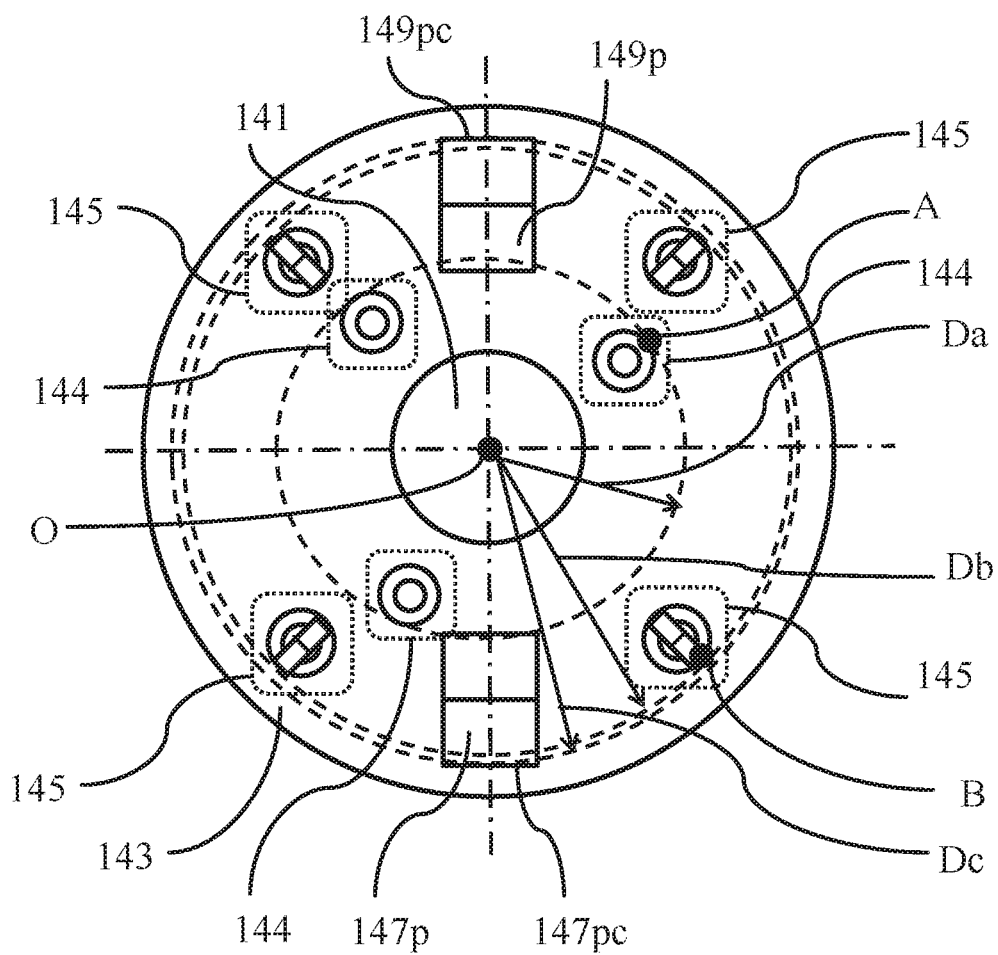
FIG. 4 illustrates a front view illustrating a positional relation between a supporting portion and a biasing portion of the optical image stabilizer of Embodiment 1.

In FIG. 2B, supporting portions 144 (provided at three circumferential positions as illustrated in FIG. 4) movably, that is, shiftably support the movable member 142 in the pitch and yaw directions with respect to the base member 143. Each of the supporting portions 144 is constituted by the above-described ball-receiving portions 142a, the ball-receiving portions 143a and the rollable balls (hereinafter simply referred to as "balls") 144a. Each of the balls 144a as a supporting member is a spherical body formed of ceramic or metal. The balls 144a are disposed at three circumferential positions between the ball-receiving portions 142a and the ball-receiving portions 143a respectively formed at the three circumferential positions. Rolling of the balls 144a between the ball-receiving portions 142a and 143a allows the movable member 142 to smoothly shift in the pitch and yaw directions with respect to the base member 143 while positioning the movable member 142 with respect to the base member 143 in the optical axis direction. Biasing portions 145 provided at four circumferential positions are each constituted by a tension spring 145a as a biasing member such as a stainless-steel coil spring and the above-described spring hangers 142b and 143b on which both ends of the tension spring 145a are hung. The torsion springs 145a bias the movable member 142 toward the base member 146 so as to cause the movable member 142 (ball-receiving portions 142a) to make contact with the balls 144a and so as to cause the balls 144a to make contact with the base member 143 (ball-receiving portions 143a). In a state (second state) where the movable member 142 is shifted with respect the center of its movable range, the torsion springs 145a provide a biasing force (that is, a shift resistance force) to the movable member 142 in a direction in which the movable member 145 is returned toward the center of the movable range. As a shift amount of the movable member 142 increases, the shift resistance force generated by the coil springs 145a increases.

The biasing portion 145 may be configured using other members than the torsion spring 145a. That is, the biasing portion 145 may be configured so as to generate a biasing force causing the movable member 142 and the base member 143 to make contact with the balls 144a, by using, for example, a magnet generating a magnetic force acting so as to attract the movable member 142 and the base member 143 to each other. In addition, materials of the ball 144a and the torsion spring 145a and a spring constant of the torsion spring 145a can be arbitrarily selected.

As illustrated in FIG. 3A, the first pitch coil 146p is constituted by a winding coil formed of a conductive wire wound in an elliptical shape including, when viewed from the optical axis direction, two linear portions and two arc portions formed at both ends of the linear portions. The first pitch coil 146p is held by the base member (first member) 143. The first pitch coil 146p has, as illustrated in FIG. 3B, in its thickness direction (optical axis direction), an end face 146pa facing the first pitch magnet 147p. A center position 146pb of the first pitch coil 146p in the pitch direction is hereinafter referred to as "a first pitch coil center".

The first pitch magnet 147p is held by the movable member (second member) 142 so as to face the first pitch coil 146p as described above. The first pitch magnet 147p is magnetized in a magnetized direction corresponding to a normal direction to an end face (first surface) 147pa thereof facing the first pitch coil 146p. The first pitch magnet 147p has, on both sides of a magnetization boundary 147pb, an N-pole portion (first pole portion) 147pn and an S-pole portion (second pole portion) 147ps. In other words, the N-pole portion 147pn and the S-pole portion 147ps are arranged on the end face 147pa in the pitch direction. The magnetization boundary 147pb is a boundary position between the N-pole portion 147pn and the S-pole portion 147ps. In this embodiment, the N-pole portion 147pn is provided on a side farther from the optical axis Oa and the S-pole portion 147ps is provided on a side closer to the optical axis Oa. The magnetization boundary 147pb extends in parallel with a longitudinal direction (corresponding to the yaw direction) of the first pitch coil 146p. The first pitch magnet 147p has an outer end face 147pc farthest from the optical element 141.

As illustrated in FIG. 3A, the second pitch coil 148p is also constituted by the winding coil formed of the conductive wire wound in the elliptical shape including, when viewed from the optical axis direction, the two linear portions and the two arc portions formed at both the ends of the linear portions. The second pitch coil 148p is held by the base member 143. The second pitch coil 148p has, as illustrated in FIG. 3B, in its thickness direction, an end face 148pa facing the second pitch magnet 149p. A center position 148pb of the second pitch coil 148p in the pitch direction is hereinafter referred to as "a second pitch coil center".

The second pitch magnet 149p is held by the movable member 142 so as to face the second pitch coil 148p as described above.

As illustrated in FIGS. 3A and 3B, in the pitch direction, the optical element 141 is disposed between the first and second pitch magnets 147p and 149p (that is, between the first and second pitch coils 146p and 148p). The second pitch magnet 149p is magnetized in its magnetized direction corresponding to a normal direction to an end face (second surface) 149pa thereof facing the second pitch coil 148p. The second pitch magnet 149p has, on both sides of a magnetization boundary 149pb, an N-pole portion 149pn and an S-pole portion 149ps. In other words, the N-pole portion 149pn and the S-pole portion 149ps are arranged on the end face 149pa in the pitch direction. The magnetization boundary 149pb is a boundary position between the N-pole portion 149pn and the S-pole portion 149ps. In this embodiment, the S-pole portion 149ps is provided on a side farther from the optical axis Oa and the N-pole portion 149pn is provided on a side closer to the optical axis Oa. The magnetization boundary 149pb extends in parallel with a longitudinal direction (corresponding to the yaw direction) of the second pitch coil 148p. The second pitch magnet 149p has an outer end face 149pc farthest from the optical element 141.

In this embodiment, in a neutral state as a first state illustrated in FIGS. 2A, 2B, 3A and 3B, the first pitch coil center 146pb has a positional difference from the magnetization boundary 147pb of the first pitch magnet 147p to the outside in the pitch direction by a later-described predetermined positional difference amount. Furthermore, the second pitch coil center 148pb has a positional difference from the magnetization boundary 149pb of the second pitch magnet 149p to the outside in the pitch direction by the above predetermined positional difference amount. In other words, the first and second pitch coil centers 146pb and 148pb have the positional differences to the same side (outside in this embodiment) of the outside and inside in the pitch direction from the magnetization boundaries 147pb and 149pb of the first and second pitch magnets 147p and 149p. This configuration provides later-described effects.

A pitch detection element 151p is constituted by a hall sensor that converts a change in magnetism according to a positional change of the first pitch magnet 147p facing the pitch detection element 151p into an electric signal. The pitch detection element 151p is fixed to the base member 143 via a holder or the like. The electric signal (hereinafter referred to as "a pitch position detection signal") from the pitch detection element 151*p* is input to the electrical substrate 101.

The yaw corrector 140*y* and the yaw detector 150*y* are disposed with directions respectively orthogonal to the pitch corrector 140*p* and the pitch detector 150*p* in a plane (hereinafter referred to as "a shift plane") orthogonal to the optical axis Oa.

As illustrated in FIGS. 2A and 3A, the first yaw coil 146*y* is also constituted by the winding coil formed of the conductive wire wound in the elliptical shape including, when viewed from the optical axis direction, the two linear portions and the two arc portions formed at both the ends of the linear portions. The first yaw coil 146*p* is held by the base member 143. The first yaw coil 146*y* has, in its thickness direction, an end face (not illustrated) facing the first yaw magnet 147*y*. A center position 146*yb* of the first yaw coil 146*y* in the yaw direction is hereinafter referred to as "a first yaw coil center".

The first yaw magnet 147*y* is held by the movable member 142 so as to face the first yaw coil 146*y* as described above. The first yaw magnet 147*y* is magnetized in a magnetized direction corresponding to a normal direction to an end face (first surface) (not illustrated) thereof facing the first yaw coil 146*y*. The first yaw magnet 147*y* has, on both sides of a magnetization boundary 147*yb*, an N-pole portion 147*yn* and an S-pole portion 147*ys*. In other words, the N-pole portion 147*yn* and the S-pole portion 147*ys* are arranged on the end face in the yaw direction. The magnetization boundary 147*yb* is a boundary position between the N-pole portion 147*yn* and the S-pole portion 147*ys*. In this embodiment, the N-pole portion 147*yn* is provided on a side farther from the optical axis Oa, and the S-pole portion 147*ys* is provided on a side closer to the optical axis Oa. The magnetization boundary 147*yb* extends in parallel with a longitudinal direction (corresponding to the pitch direction) of the first yaw coil 146*y*. The first yaw magnet 147*y* has an outer end face 147*yc* farthest from the optical element 141.

As illustrated in FIG. 3A, the second yaw coil 148*y* is also constituted by the winding coil formed of the conductive wire wound in the elliptical shape including, when viewed from the optical axis direction, the two linear portions and the two arc portions formed at both the ends of the linear portions. The second yaw coil 148*y* is held by the base member 143. The second yaw coil 148*y* has, in its thickness direction, an end face 148*ya* facing the second yaw magnet 149*y*. A center position 148*yb* of the second yaw coil 148*y* in the yaw direction is hereinafter referred to as "a second yaw coil center".

The second yaw magnet 149*y* is held by the movable member 142 so as to face the second yaw coil 148*y* as described above. As illustrated in FIG. 3A, in the yaw direction, the optical element 141 is disposed between the first and second yaw magnets 147*y* and 149*y* (that is, between the first and second yaw coils 146*y* and 148*y*). The second yaw magnet 149*y* is magnetized in its magnetized direction corresponding to a normal direction to an end face (second face) (not illustrated) thereof facing the second yaw coil 148*y*. The second yaw magnet 149*y* has, on both sides of a magnetization boundary 149*yb*, an N-pole portion 149*yn* and an S-pole portion 149*ys*. In other words, the N-pole portion 149*yn* and the S-pole portion 149*ys* are arranged on the end face in the yaw direction. The magnetization boundary 149*yb* is a boundary position between the N-pole portion 149*yn* and the S-pole portion 149*ys*. In this embodiment, the S-pole portion 149*ys* is provided on a side farther from the optical axis Oa, and the N-pole portion 149*yn* is provided on a side closer to the optical axis Oa. The magnetization boundary 149*yb* extends in parallel with a longitudinal direction (corresponding to the pitch direction) of the second yaw coil 148*y*. The second yaw magnet 149*y* has an outer end face 149*yc* farthest from the optical element 141.

In this embodiment, in the neutral state illustrated in FIGS. 2A and 3A, the first yaw coil center 146*yb* has a positional difference from the magnetization boundary 147*yb* of the first yaw magnet 147*y* to the outside in the yaw direction by a predetermined positional difference amount. Furthermore, the second yaw coil center 148*yb* has a positional difference from the magnetization boundary 149*yb* of the second yaw magnet 149*y* to the outside in the pitch direction by the above predetermined positional difference amount. In other words, the first and second yaw coil centers 146*yb* and 148*yb* have positional differences to the same side (outside in this embodiment) of the outside and inside in the yaw direction from the magnetization boundaries 147*yb* and 149*yb* of the first and second yaw magnets 147*y* and 149*y*. This configuration provides later-described effects. Furthermore, in this embodiment, the first and second pitch magnets 147*p* and 149*p* and the first and second yaw magnets 147*y* and 149*y* are disposed, as illustrated in FIG. 3B, at the same position (in the same area) in the optical axis direction as that of the optical element 141. This configuration can prevent an increase in thickness of the optical image stabilizer 100 in the optical axis direction. The coils and the magnets are disposed at positions where they do not interfere with one another when the movable member 142 shifts in its movable range and which are close to the optical element 141 such that a size (diameter) of the optical image stabilizer 100 in the shift direction is as small as possible.

A yaw detection element 151*y* is constituted by a hall sensor that converts a change in magnetism according to a positional change of the first yaw magnet 147*y* into an electric signal. The yaw detection element 151*y* is fixed to the base member 143 via a holder or the like. The electric signal (hereinafter referred to as "a yaw position detection signal") from the yaw detection element 151*y* is input to the electrical substrate 101.

Although the description of this embodiment will be continued below, the configurations of the optical image stabilizer 100 in the pitch and yaw directions are identical to each other, so that the description will be made of the configuration in the pitch direction.

Next, description will be made of the disposition of the supporting portions 144 and the biasing portions 145 with referring to FIG. 4. FIG. 4 illustrates only the base member 143, the first pitch magnet 147*p*, the second pitch magnet 149*p*, the supporting portions 144 and the biasing portions 145. In each of the supporting portion 144 a point farthest from the optical axis Oa is defined as a point A, and in each of the biasing portion 145 a point farthest from the optical axis Oa is defined as a point B. A circle passing the point A, a circle passing the point B and a circle contacting the outer end faces 147*pc* and 149*pc* of the first and second pitch magnets 147*p* and 149*p*, whose centers are a center O of the optical element 141, respectively have diameters Da, Db and Dc. In this embodiment, the first pitch magnet 147*p*, the second pitch magnet 149*p*, the supporting portions 144 and the biasing portions 145 are disposed such that relations of Da<Dc and Db<Dc are satisfied. Accordingly, when viewed from the optical axis direction, the balls 144*a* of the supporting portions 144 and the tension springs 145*a* of the biasing portions 145 are disposed closer to the optical axis Oa than the outer end faces 147*pc* and 149*pc* of the first and second pitch magnets 147p and 149p. Such a disposition of the first and second pitch magnets 147p and 149p near the optical element 141 makes it possible to reduce a size of the optical image stabilizer 100 in its radial direction.

Figure 5:
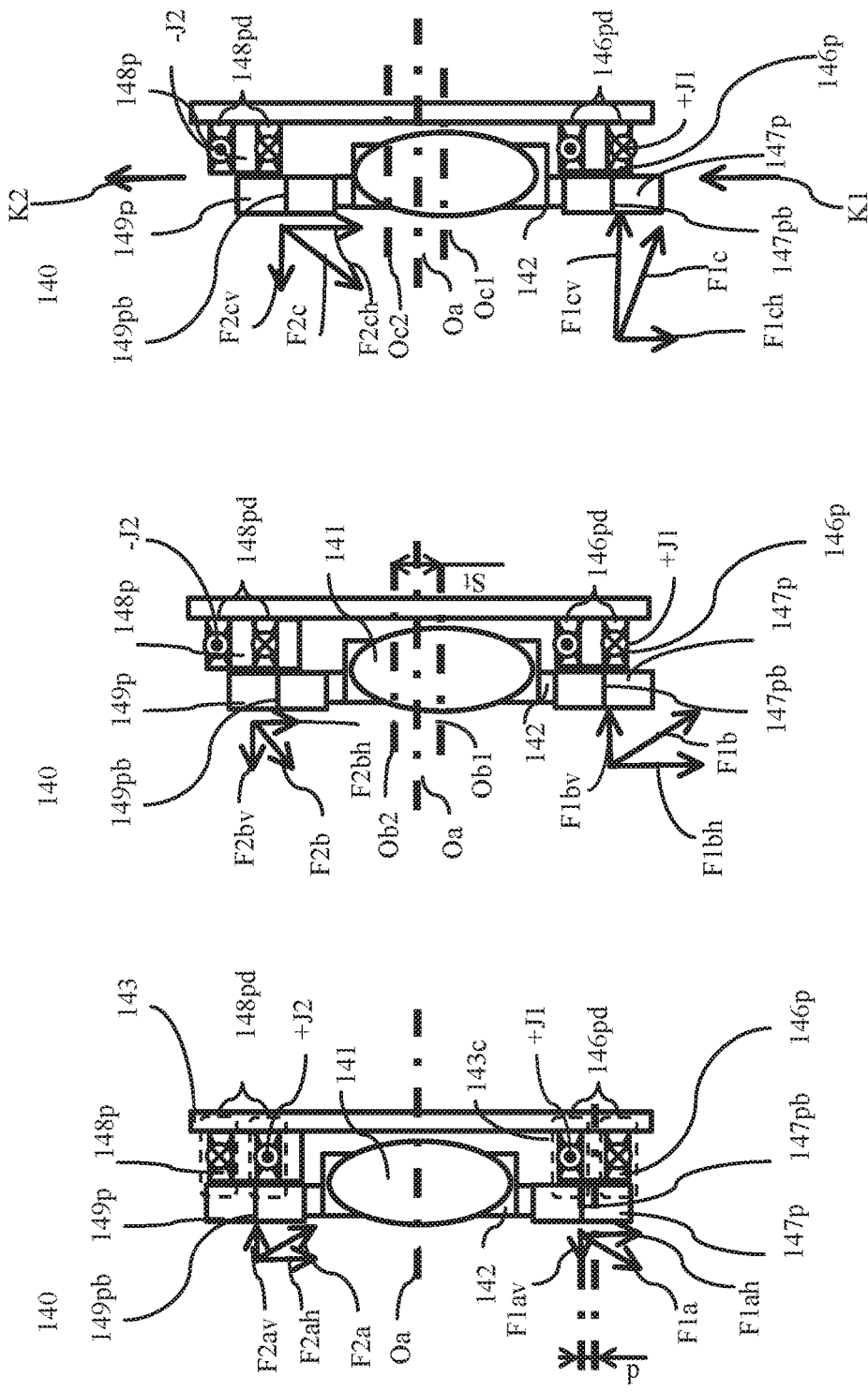
FIGS. 5A to 5C are sectional views illustrating operations of the optical image stabilizer of Embodiment 1.

Next, with referring to FIGS. 5A to 5C, description will be made of operations of the corrector 140. FIGS. 5A to 5C illustrate a section of the corrector 140 viewed from the yaw direction when the predetermined positional difference amount of the first and second pitch magnets 147p and 149p from the first and second pitch coils 146p and 148p in the shift direction (pitch direction) are equally set to d. In FIGS. 5A to 5C, the limitation of the movable range of the movable member 142 by the stopper portion 143c is eliminated.

FIG. 5A illustrates the neutral state where the movable member 142 is located at the center of its movable range. The first and second pitch coils 146p and 148p are respectively energized with electric currents flowing in a +J1 direction and a +J2 direction, which are opposite to each other, such that components of Lorenz forces generated by electromagnetic effects between these first and second pitch coils 146p and 148p and the first and second pitch magnets 147p and 149p act toward the same side in the shift direction of the movable member 142. The Lorenz forces generated at the first pitch magnet 147p and the second pitch magnet 149p are denoted by F1a and F2a. The component of F1a in the shift direction, which is hereinafter referred to as "a shift direction component", is denoted by F1ah, and a component of F1a in a direction orthogonal to the shift direction, which is hereinafter referred to as "an optical axis direction component", is denoted by F1av. Similarly, the shift direction component of F2a is denoted by F2ah, and an optical axis direction component of F2a is denoted by F2av. A resultant force of the shift direction components F1ah and F2ah is a thrust force acting on the movable member 142. The optical axis direction components F1av and F2av are out-of-plane forces acting on the movable member 142 so as to bias it in the optical axis direction. In FIG. 5A, both the first and second pitch magnets 147p and 149p receive the thrust force.

FIG. 5B illustrates a state (second state) where the movable member 142 has been shifted from the neutral state illustrated in FIG. 5A and thereby the magnetization boundary 147pb of the first pitch magnet 147p is located at a position immediately before reaching an outside part (that is, a far side part farther from the optical element 141 than an inside part) of a coil wire bundle portion 146pd of the first pitch coil 146p. In this state, the second pitch magnet 149p has passed by a far side part (from the optical element 141) of a coil wire bundle portion 148pd of the second pitch coil 148p, and thereby the Lorenz force between the second pitch coil and magnet 147p and 149p inverts its direction. Therefore, in order to cause the shift direction components of the Lorenz forces to act toward the same side in the shift direction, this embodiment applies the electric current in the +J1 direction to the first pitch coil 146p and applies an electric current in a −J2 direction opposite to the +J2 direction in FIG. 5A to the second pitch coil 148p to generate Lorenz forces F1b and F2b. A resultant force of shift direction components F1bh and F2bh of the Lorenz forces F1b and F2b is a thrust force acting on the movable member 142, and optical axis direction components F1bv and F2bv are out-of-plane forces acting on the movable member 142 so as to bias it in the optical axis direction. In FIG. 5B, the second pitch magnet 149p is out of an area facing a one side part (a far side part from the optical element 141) of the coil wire bundle portion 148pd of the second pitch coil 148p, so that the thrust force becomes small. However, a sufficient thrust force is generated between the first pitch magnet 147p and the first pitch coil 146p, so that the movable member 142 can be shifted.

FIG. 5C illustrates a state where the movable member 142 has been shifted from the state illustrated in FIG. 5B and thereby the magnetization boundary 147pb of the first pitch magnet 147 is located at a position reaching the far side part (from the optical element 141) of the coil wire bundle portion 146pd of the first pitch coil 146p. In FIG. 5C, arrows K1 and K2 indicate magnitudes and directions of the shift resistance forces generated by the four tension springs 145a (not illustrated in FIG. 5C). In this state, applying the electric current in the +J1 direction to the first pitch coil 146p and applying the electric current in the −J2 direction to the second pitch coil 148p generates Lorenz forces F1c and F2c. A resultant force of shift direction components F1ch and F2ch of the Lorenz forces F1c and F2c is a thrust force acting on the movable member 142, and optical axis direction components F1cv and F2cv are out-of-plane forces acting on the movable member 142 so as to bias it in the optical axis direction. In FIG. 5C, the magnetization boundary 147pb of the first pitch magnet 147p reaches the far side part (from the optical element 141) of the coil wire bundle portion 146pd of the first pitch coil 146p, so that the thrust force becomes small and thereby the out-of-plane forces become larger than the thrust force. On the other hand, as well as in FIG. 5B, the second pitch magnet 149p is out of the area facing the one side part of the coil wire bundle portion 148pd of the second pitch coil 148p, so that the thrust force becomes small. This position indicates a position from which the movable member 142 cannot be further shifted since the thrust force is in balance with the shift resistance forces K1 and K2 generated by the tension springs 145a biasing the movable member 142, that is, a maximum shiftable position when the stopper member 143c is eliminated. As described above, eliminating the limitation of the movable range of the movable member 142 by the stopper member 143c enables the shifting of the movable member 142 to the maximum shiftable position illustrated in FIG. 5C.

However, the movable range is generally set as a range including a margin for variations of the shift resistance forces of the tension springs 145a. Thus, this embodiment employs the configuration that the movable member 142 makes contact with the stopper member 143c at the position illustrated in FIG. 5B. In other words, this embodiment sets the movable range of the movable member 142 to the range to the position illustrated in FIG. 5B. However, a larger movable range may be set by disposing the stopper member 143c farther away from the center O of the optical element 141 as long as the thrust force is generated.

When the movable member 142 is shifted in a direction opposite to the shift direction illustrated in FIGS. 5A to 5C, the directions of the electric currents and the directions of the forces are inverted.

Figure 6:
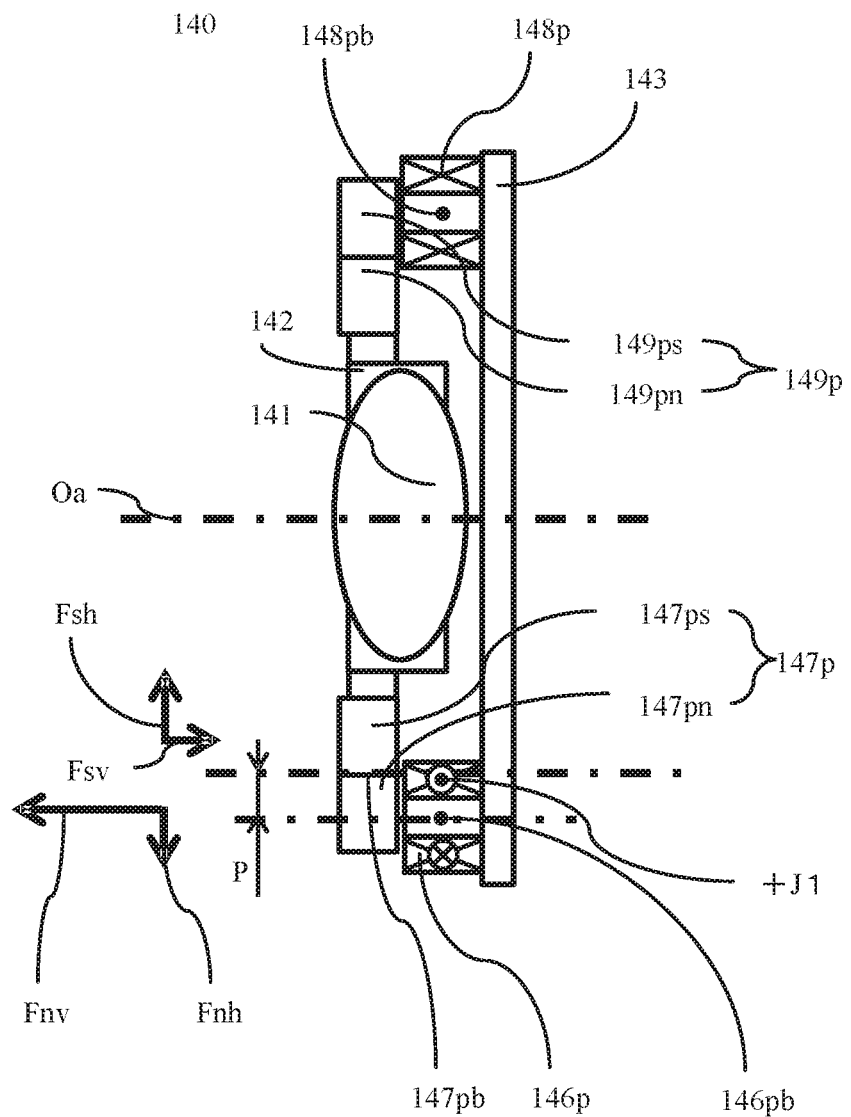
FIG. 6 is a sectional view illustrating a positional difference amount of a coil and a magnet of an optical image stabilizer that is a comparative example.

Next, description will be made of a limit value of the positional difference amount d between the coil and magnet in the corrector 140 with referring to FIG. 6. FIG. 6 illustrates, as a comparative example different from this embodiment, a configuration where the limit value of the positional difference amount d is P. FIG. 6 illustrates a neutral state. In FIG. 6, the limitation of the movable member 142 by the stopper member 143c is eliminated.

In the neutral position, the first pitch coil 146p is energized with an electric current flowing in the +J1 direction. The limit value P is a positional difference amount at which a shift direction component Fnh of a Lorenz force generated between the first pitch coil 146*p* and the N-pole portion 147*pn* of the first pitch magnet 147*p* is in balance with a shift direction component Fsh of a Lorenz force generated between the first pitch coil 146*p* and the S-pole portion 147*ps* of the first pitch magnet 147*p*. Forces generated between the first pitch coil 146*p* and the first pitch magnet 147*p* are only out-of-plane forces Fnv and Fsv, and thereby a thrust force is not generated. Similarly, a thrust force is not generated between the second pitch coil 148*p* and the second pitch magnet 149*p*. Thus, the movable member 142 cannot be shifted from the neutral state. However, the positional difference amount d smaller than P causes an imbalance between the shift direction component Fnh generated between the first pitch coil 146*p* and the N-pole portion 147*pn* and the shift direction component Fsh generated between the first pitch coil 146*p* and the S-pole portion 147*ps*. Therefore, a thrust force can be generated to enable shifting the movable member 142. Accordingly, it is necessary that the actual positional difference amount d be smaller than P. In other words, setting the actual positional difference amount d large as long as it is smaller than P enables shifting the movable member 142 from the neutral state. The positional difference amount at which the force Fnh in the shift direction generated between the energized first pitch coil 146*p* and the N-pole portion 147*pn* is in balance with the force Fsh in the shift direction generated between the first pitch coil 146*p* and the S-pole portion 147*ps* is defined as P.

It is necessary that the actual positional difference amount d be smaller than P. Thus, in the neutral state where the center of the movable member 142 is located at the center of its movable range, the positional difference amount d is set such that the force Fnh in the shift direction generated between the energized first pitch coil 146*p* and the N-pole portion 147*pn* is not in balance with the force Fsh in the shift direction generated between the first pitch coil 146*p* and the S-pole portion 147*ps*.

Figure 7:
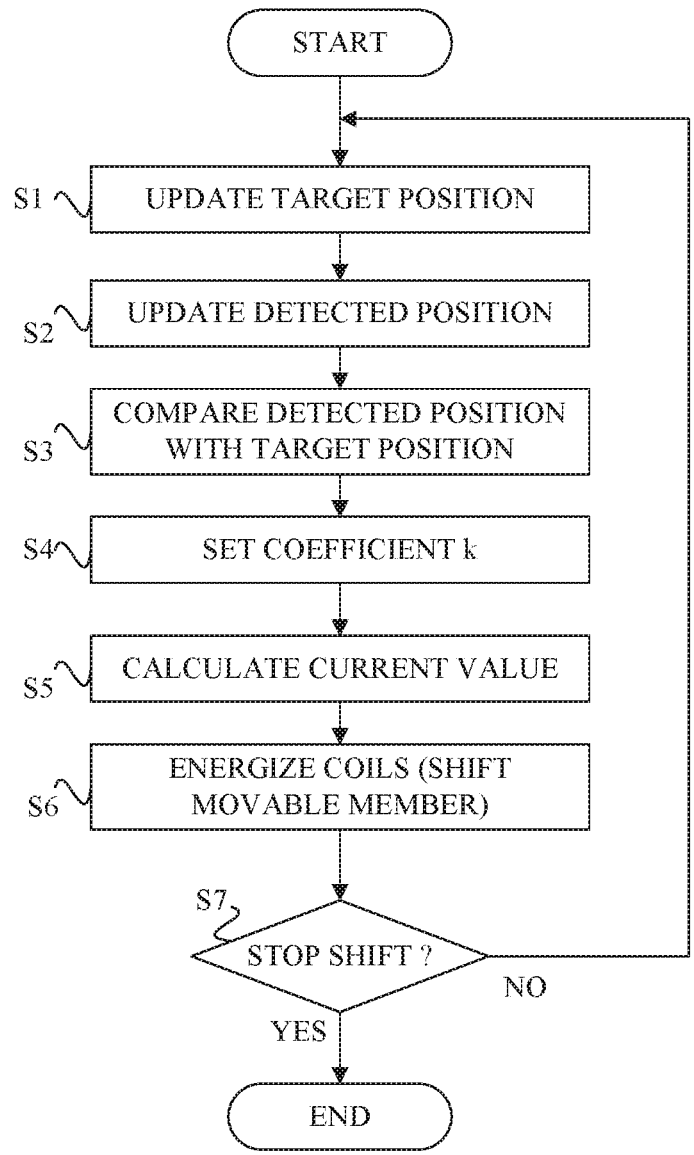
FIG. 7 is a flowchart illustrating control of the optical image stabilizer of Embodiment 1.

Next, with referring to a flowchart of FIG. 7, description will be made of a process to control the optical image stabilizer 100 (energization of each coil). FIG. 7 illustrates a process flow of the image stabilization operation from its start to its end. A controller constituted by the comparator 110 and the calculator 120 executes this process according to a computer program. Since the movable member 142 is shifted in the pitch and yaw directions by the basically same processes, the following description will be made of a case of shifting the movable member 142 in the pitch direction.

At step S1, the comparator 110 reads a target position of the movable member 142, which is input to the optical image stabilizer 100, and then updates the target position.

Next, at step S2, the comparator 110 acquires the pitch position detection signal from the detector 150 and then updates a detected position of the movable member 142 in the pitch direction.

Next, at step S3, the comparator 110 calculates a difference (hereinafter referred to as "a position difference") between the target position updated at step S1 and the detected position updated at step S2.

Next, at step S4, the calculator 120 calculates, at the gain calculator 120*g*, a coefficient k depending on the position difference calculated at step S3.

A larger value of the coefficient k increases the thrust force to shift the movable member 142. Specifically, the gain calculator 120*g* calculates different coefficients k for different shift amounts of the movable member 142. For example, a larger shift amount of the movable member 142 increases the shift resistance force generated by the tension springs 145*a*, so that the gain calculator 120*g* calculates a larger coefficient k. Furthermore, the gain calculator 120*g* calculates different coefficients k for different position differences between the target and detected positions. For example, as the position difference increases, the gain calculator 120*g* calculates a larger coefficient k such that the movable member 142 is more rapidly shifted. When the detected position coincides with the target position, since the movable member 142 is not required to be further shifted, the gain calculator 120*g* sets the coefficient k to 0.

Next, at step S5, the calculator 120 calculates a current value to be applied to each coil.

The function calculator 120*f* stores a first function a(x) and a second function b(x) where x represents the shift amount of the movable member 142. The function calculator 120*f* sets a first distribution value d1 using the shift amount x of the movable member 142 and the first function a(x) and sets a second distribution value d2 using the shift amount x of the movable member 142 and the second function b(x). The distribution values d1 and d2 respectively indicate ratios of the electric currents to be applied to the first and second pitch coils 146*p* and 148*p*. The function calculator 120*f* calculates the shift amount x of the movable member 142 from the pitch detection signal received from the detector 150 and calculates the first and second distribution values d1 and d2 using the shift amount x and the first and second functions a(x) and b(x) to output the first and second distribution values d1 and d2 to the gain calculator 120*g*.

Figure 8A:
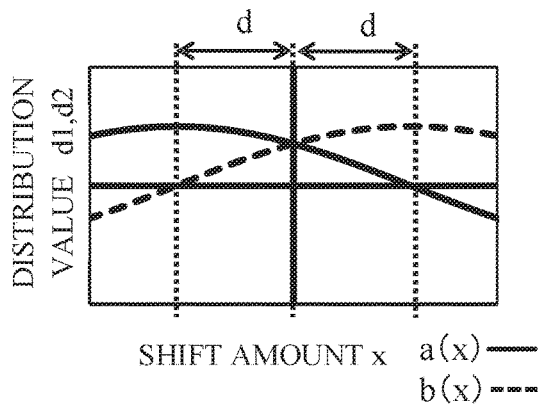
FIGS. 8A to 8D illustrate examples of calculations performed by a function calculator in Embodiment 1.

FIG. 8A illustrates an example of the first and second functions a(x) and b(x) for the shift amounts x of the movable member 142. When, as illustrated in FIG. 8A, a length of the magnet in a direction orthogonal to the magnetization boundary of that magnet is represented by w, and a positional difference amount of the magnet with respect to the coil is represented by d, the first and second functions a(x) and b(x) are expressed as follows from later-described two reasons.

$$a(x)=\sin\{[2\pi(x+d)]/2w\} \tag{1}$$

$$b(x)=\sin\{[2\pi(x-d)]/2w\} \tag{2}$$

The first reason is that the first and second functions a(x) and b(x) as trigonometric functions can smoothly drive the movable member 142 like a micro-step drive method for stepping motors.

Figure 8B:
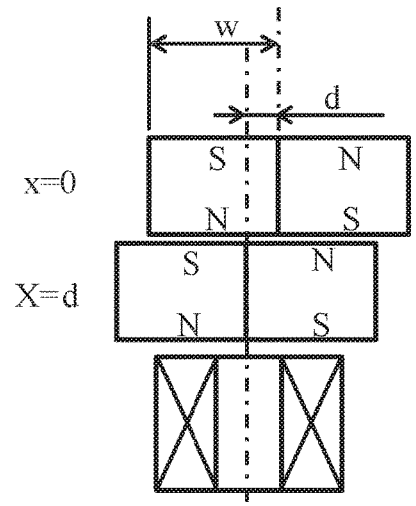
Figure 8C:
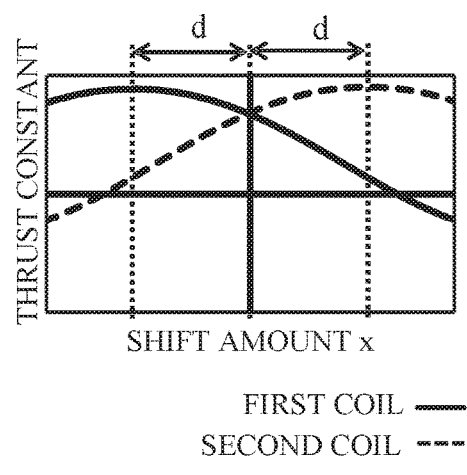

The second reason is that shifting phases of the first and second functions a(x) and b(x) by d with respect to x makes values of the first and second functions a(x) and b(x) maximum at a position where the movable member 142 is shifted by d, which makes the current value applied to each coil maximum. At this position where x=d as illustrated in FIG. 8B, the magnetization boundary of the magnet is located in the shift direction at the same position as that of the center of the coil. This relation between the magnet and coil makes, as illustrated in FIG. 8C, a thrust constant maximum; the thrust constant indicates a thrust force corresponding to a unit current value.

Figure 8D:
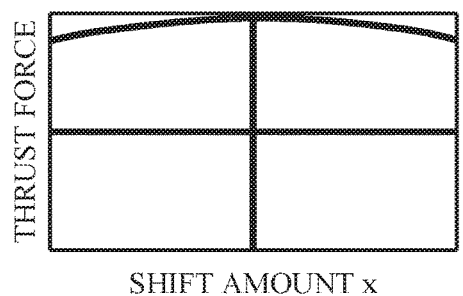

Accordingly, shifting the phases of the first and second functions a(x) and b(x) by d with respect to x enables generating, between a pair of the coil and the magnet, a maximum thrust force at a most efficient position. As described above, this embodiment defines the trigonometric functions whose phases are shifted by an amount corresponding to the positional difference amount between the coil and magnet as the first and second functions a(x) and b(x). Using such first and second functions a(x) and b(x) enables, as illustrated in FIG. 8D, generating the thrust force with a high efficiency regardless of the shift amount x and with less variation (with a smooth change) depending on the shift amount x.

Although this embodiment describes the case where the first and second functions a(x) and b(x) are trigonometric functions, other functions may be used as the first and second functions a(x) and b(x).

The gain calculator 120g sets a value k×d1 obtained by multiplying the first distribution value d1 by the coefficient k calculated at step S4 to the current value to be applied to the first pitch coil 146p and sets a value k×d2 obtained by multiplying the second distribution value d2 by the coefficient k to the current value to be applied to the second pitch coil 148p.

At step S6, the calculator 120 applies an electric current corresponding to the current value calculated at step S5 to each coil in the corrector 140 through each coil drive circuit in the driver 130. This energization of each coil generates the Lorenz force between each coil and each corresponding magnet, and thereby the movable member 142 is shifted.

Next, at step S7, the comparator 110 and the calculator 120 determine whether or not the detected position coincides with the target position, that is, whether or not to stop the shift of the movable member 142. If not to stop the shift of the movable member 142, the comparator 110 and the calculator 120 return to step S1 to continue the process until the detected position coincides with the target position. On the other hand, if the detected position coincides with the target position, the comparator 110 and the calculator 120 stops the shift of the movable member 142 and then ends the process.

Figure 9A:
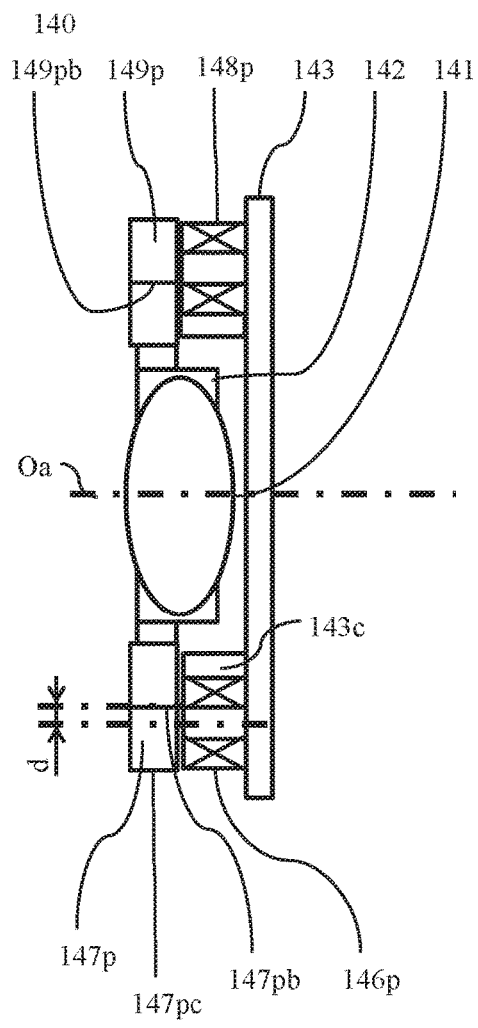
FIGS. 9A and 9B are sectional views illustrating a movable amount and a diameter of the optical image stabilizer of Embodiment 1.
Figure 9B:
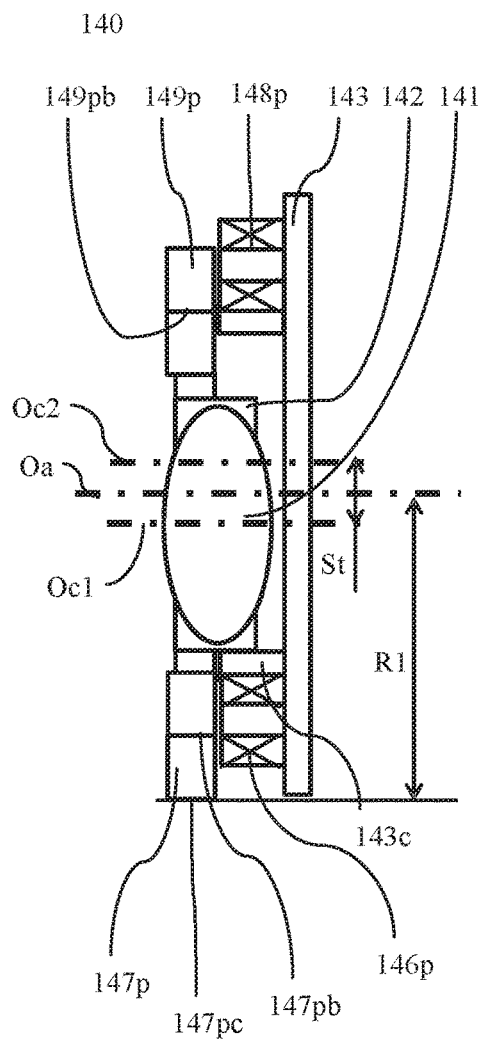

Next, description will be made of the effects provided by this embodiment with referring to FIGS. 9A and 9B. FIG. 9A illustrates a section of the optical image stabilizer 100 in the neutral state when viewed from the yaw direction. FIG. 9A indicates the optical axis of the optical element 141 in the neutral position by Oa. FIG. 9B illustrates a state where the movable member 142 has been shifted from the neutral state and thereby the magnetization boundary 147pb of the first pitch magnet 147p is located at a position (that is, an end position of the movable range) immediately before reaching the far side part (from the optical element 141) of the coil wire bundle portion 146pd of the first pitch coil 146p. FIG. 9B indicates the optical axis of the optical element 141 in this state by Oc1 and indicates the optical axis of the optical element 141 when the movable member 142 has reached an opposite end position of the movable range by Oc2. The maximum shiftable amount of the movable member 142 corresponds to a distance St between mutually opposite end positions of the movable range. A distance from the outer end face 147pc of the first pitch magnet 147p to the optical axis Oa is R1. A longer distance R1 increases a diameter of the optical image stabilizer 100.

Figure 10A:
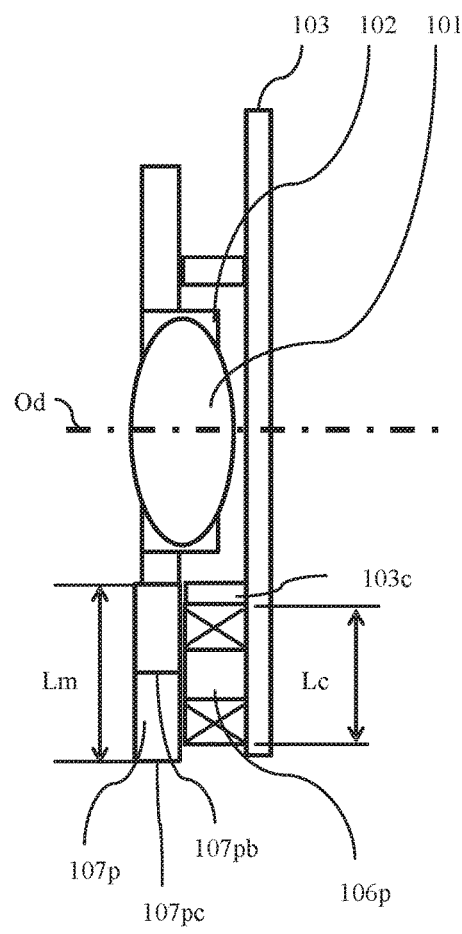
FIGS. 10A and 10B are sectional views illustrating a movable amount and a diameter of a conventional optical image stabilizer.
Figure 10B:
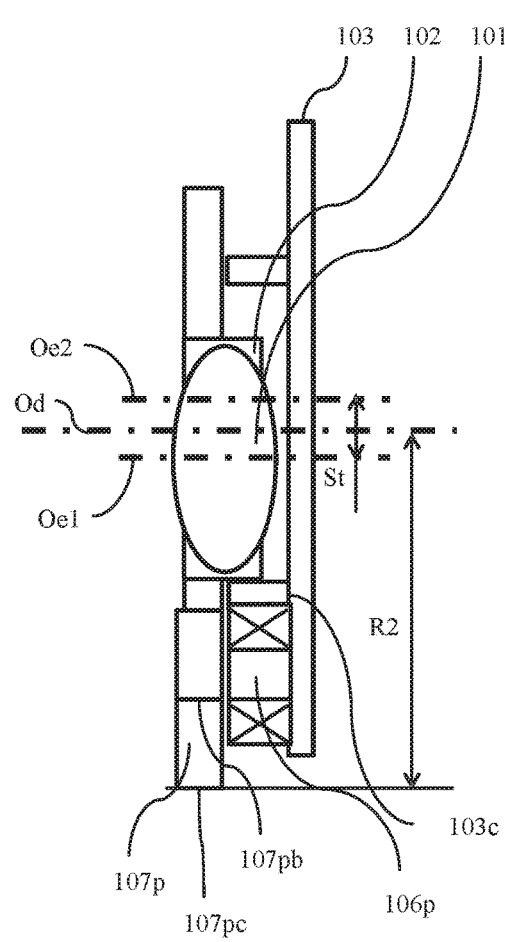

FIGS. 10A and 10B illustrates a configuration of a conventional optical image stabilizer using, for driving a movable member 102 in the pitch direction, one coil (first pitch coil) 106p and one magnet (first pitch magnet) 107p when viewed from the yaw direction.

A maximum shift amount of the movable member 102 in this optical image stabilizer is equal to St illustrated in FIG. 9B. FIG. 10A illustrates the neutral state and indicates an optical axis of an optical element 101 by Od. FIG. 10B illustrates a state where the movable member 102 has been shifted from the neutral state and thereby a magnetization boundary 107pb of the first pitch magnet 107p is located at a position (that is, an end position of the movable range) immediately before reaching a far side part (from the optical element 101) of a coil wire bundle portion 106pd of the first pitch coil 106p. FIG. 10B indicates the optical axis of the optical element 101 in this state by Oe1 and indicates the optical axis of the optical element 141 when the movable member 102 has reached an opposite end position of its movable range by Oe2.

When one coil and one magnet are used like this optical image stabilizer, in order to make the maximum shiftable amount of the movable member 102 equal to St illustrated in FIG. 9B, it is necessary to increase a length Lc of the first pitch coil 106p in a direction (pitch direction) orthogonal to its longitudinal direction. Furthermore, the first pitch coil 106p and the first pitch magnet 107p overlap each other at their approximately entire portions in the optical axis direction in the entire movable range, so that it is necessary to increase a length Lm of the first pitch magnet 107p in a direction (pitch direction) orthogonal to its longitudinal direction. As a result, although the maximum shiftable amount of the movable member 102 is St, a distance from the outer end face 107pc of the first pitch magnet 107p to the optical axis Od when the movable member 102 has reached the end of the movable range is R2 larger than R1.

Accordingly, the optical image stabilizer 100 of this embodiment illustrated in FIGS. 9A and 9B can be reduced in size in its radial direction as compared to the conventional optical image stabilizer illustrated in FIGS. 10A and 10B, while providing the same maximum shiftable amount of the movable member.

As described above, the optical image stabilizer 100 of this embodiment using the VCM as the actuator enables reducing an increase in its diameter while providing a large maximum shiftable amount.

Although this embodiment described the case where the positional difference amounts of the first and second pitch coil centers from the magnetization boundaries of the first and second pitch magnets are equally set, mutually different positional difference amounts may be set depending on, for example, a difference (error) of the Lorenz forces generated between the first pitch coil and the first pitch magnet and generated between the second pitch coil and the second pitch magnet. This also applies to other embodiments described later.

[Embodiment 2]

Next, description will be made of an optical image stabilizer 200 that is a second embodiment (Embodiment 2) of the present invention. In this embodiment, constituent elements common to those in Embodiment 1 are denoted by the same reference numerals as those in Embodiment 1, and their description will be omitted. In this embodiment, description will be mainly made of differences from Embodiment 1.

FIGS. 11A and 11B illustrate a configuration of the optical image stabilizer 200. FIG. 11A illustrates a configuration of the optical image stabilizer 200 when viewed from an optical axis direction, and FIG. 11B illustrates a section thereof along a III-III line in FIG. 11A (that is, a section when viewed from a yaw direction). In addition, FIGS. 11A and 11B illustrate a neutral state (first state) where a movable member 242 is located at a center of its movable range.

A first pitch coil 246p is held by the movable member (first member) 242 holding an optical element 141, and a first pitch magnet 247p is held by a base member (second member) 243 so as to face the first pitch coil 246p in the optical axis direction. A second pitch coil 248p is held by the movable member 242, and a second pitch magnet 249p is held by the base member 243 so as to face the second pitch coil 248p in the optical axis direction. As illustrated in FIG.

11A, in the pitch direction, the optical element 141 is disposed between the first and second pitch coils 246p and 248p (that is, between the first and second pitch magnets 247p and 249p). A first yaw coil 246y is held by the movable member 242, and a first yaw magnet 247y is held by the base member 243 so as to face the first yaw coil 246y in the optical axis direction. A second yaw coil 248y is held by the movable member 242, and a second yaw magnet 249y is held by the base member 243 so as to face the second yaw coil 248y in the optical axis direction. As illustrated in FIG. 11A, in the yaw direction, the optical element 141 is disposed between the first and second yaw coils 246y and 248y (that is, between the first and second yaw magnets 247y and 249y).

Furthermore, the first and second pitch coils 246p and 248p and the first and second yaw coils 246y and 248y are disposed, as illustrated in FIG. 11B, at the same position (in the same area) in the optical axis direction as that of the optical element 141. This configuration can prevent an increase in thickness of the optical image stabilizer 200 in the optical axis direction.

Although the description of this embodiment will be continued below, the configurations of the optical image stabilizer 200 in the pitch and yaw directions are identical to each other, so that the description will be made of the configuration in the pitch direction.

In this embodiment, in the neutral state illustrated in FIG. 11B, a first pitch coil center 246pb has a positional difference from a magnetization boundary 247pb of the first pitch magnet 247p to an inside in the pitch direction by a predetermined positional difference amount. Furthermore, a second pitch coil center 248pb also has a positional difference from a magnetization boundary 249pb of the second pitch magnet 249p to an inside in the pitch direction by the above predetermined positional difference amount. In other words, the first and second pitch coil centers 246pb and 248pb have positional differences to the same side (inside in this embodiment) of the outside and inside in the pitch direction from the magnetization boundaries 247pb and 249pb of the first and second pitch magnets 247p and 249p. A pitch detection element (not illustrated) is fixed to the movable member 242 via a holder or the like and converts a change in magnetism according to a positional change of the first pitch magnet 247p facing the pitch detection element into an electric signal.

This embodiment is different from Embodiment 1 in that the coils are held by the movable member 242 and the magnets are held by the base member 243. This configuration enables reducing a weight of the movable member 242 including the coils, as compared to Embodiment 1 in which the movable member 142 holds the magnets, which enables reducing a current value applied to each coil and miniaturizing each coil.

In this embodiment, operations of a corrector, a positional difference amount (d) of each coil center with respect to the magnetization boundary of each magnet and control of the optical image stabilizer 200 are the same as those in Embodiment 1.

Also in this embodiment, the optical image stabilizer 200 using a VCM as an actuator enables reducing an increase in its diameter while providing a large maximum shiftable amount.

[Embodiment 3]

Next, description will be made of an optical image stabilizer 300 that is a third embodiment (Embodiment 3) of the present invention. In this embodiment, constituent elements common to those in Embodiment 1 are denoted by the same reference numerals as those in Embodiment 1, and their description will be omitted. In this embodiment, description will be mainly made of differences from Embodiment 1.

FIGS. 12A and 12B illustrate a configuration of the optical image stabilizer 300. FIG. 12A illustrates a configuration of the optical image stabilizer 300 when viewed from an optical axis direction, and FIG. 12B illustrates a section thereof along a IV-IV line in FIG. 12A (that is, a section when viewed from a yaw direction). In addition, FIGS. 12A and 12B illustrate a neutral state (first state) where a movable member 342 is located at a center of its movable range.

In this embodiment, as in Embodiment 1, coils 346p, 348p, 346y and 348y are held by a base member 343, and magnets 347p, 349p, 347y and 349y are held by the movable member 342.

Although the description of this embodiment will be continued below, the configurations of the optical image stabilizer 300 in a pitch direction and the yaw direction are identical to each other, so that the description will be made of the configuration in the pitch direction.

Also in this embodiment, as illustrated in FIG. 12A, in the pitch direction, an optical element 141 is disposed between the first and second pitch magnets 347p and 349p (that is, between the first and second pitch coils 346p and 348p). In the neutral state where the movable member 342 is located at the center of its movable range, a first pitch coil center has a positional difference from a magnetization boundary of the first pitch magnet 347p to an inside in the pitch direction by a predetermined positional difference amount. Furthermore, a second pitch coil center has a positional difference from a magnetization boundary of the second pitch magnet 349p to an inside in the pitch direction by the predetermined positional difference amount. In other words, the first and second pitch coil centers have positional differences to the same side (inside in this embodiment) of the outside and inside in the pitch direction with respect to the magnetization boundaries of the first and second pitch magnets 347p and 349p. Providing such a positional difference to the inside in the pitch direction to the center of each coil held by the base member 343 with respect to the magnetization boundary of each magnet enables reducing the size of the base member 343 in its radial direction. As a result, when the optical image stabilizer 300 is installed in an optical apparatus such as cameras, a freedom degree of arrangement of various parts arranged around the optical image stabilizer 300 can be increased.

In this embodiment, operations of a corrector, a positional difference amount (d) of each coil center with respect to the magnetization boundary of each magnet and control of the optical image stabilizer 300 are the same as those in Embodiment 1.

Although FIGS. 12A and 12B illustrate a moving magnet type optical image stabilizer 300 in which each magnet is held by the movable member 342 and each coil is held by the base member 343, a moving coil type optical image stabilizer 400 illustrated in FIGS. 13A and 13B, which is the same type as the optical image stabilizer 200 of Embodiment 2 in which each coil is held by the movable member and each magnet is held by the base member, may be employed.

FIG. 13A illustrates a configuration of the optical image stabilizer 400 when viewed from an optical axis direction, and FIG. 13B illustrates a section thereof along a V-V line in FIG. 13A (that is, a section when viewed from a yaw direction). FIGS. 13A and 13B illustrate a neutral state (first state) where a movable member 442 is located at a center of its movable range. A center of a first pitch coil 446p (first pitch coil center) has a positional difference from a magnetization boundary of a first pitch magnet 447p to an outside in the pitch direction by a predetermined positional difference amount. Furthermore, a center of a second pitch coil 448p (second pitch coil center) has a positional difference from a magnetization boundary of a second pitch magnet 449p to an outside in the pitch direction by the above predetermined positional difference amount.

Also in this embodiment, each of the optical image stabilizers 300 and 400 using a VCM as an actuator enables reducing an increase in its diameter while providing a large maximum shiftable amount.

[Embodiment 4]

Next, description will be made of an optical image stabilizer 500 that is a fourth embodiment (Embodiment 4) of the present invention. In this embodiment, constituent elements common to those in Embodiment 1 are denoted by the same reference numerals as those in Embodiment 1, and their description will be omitted. In this embodiment, description will be mainly made of differences from Embodiment 1. FIGS. 14A and 14B illustrate a configuration of the optical image stabilizer 500. FIG. 14A illustrates a configuration of the optical image stabilizer 500 when viewed from an optical axis direction, and FIG. 14B illustrates a section thereof along a VI-VI line in FIG. 14A (that is, a section when viewed from a yaw direction). FIGS. 14A and 14B illustrate a neutral state (first state) where a movable member 542 is located at a center of its movable range.

Also in this embodiment, coils 546p, 548p, 546y and 548y are held by a base member 543, and magnets 547p, 549p, 547y and 549y are held by the movable member 542. Also in this embodiment, in a pitch direction, an optical element 141 is disposed between the first and second pitch magnets 547p and 549p (that is, between the first and second pitch coils 546p and 548p).

In the neutral state, a center of the first pitch coil 546p (first pitch coil center) has a positional difference from a magnetization boundary of the first pitch magnet 547p to an outside in the pitch direction by a predetermined positional difference amount. Furthermore, a center of a second pitch coil 548p (second pitch coil center) has a positional difference from a magnetization boundary of the second pitch magnet 549p to an outside in the pitch direction by the above predetermined positional difference amount. In other words, the first and second pitch coil centers have positional differences to the same side (outside in this embodiment) of the outside and inside in the pitch direction with respect to the magnetization boundaries of the first and second pitch magnets 547p and 549p. This also applies to first and second yaw coils 546y and 548y and first and second yaw magnets 547y and 549y.

However, in this embodiment, the second pitch magnet 549p is disposed between the base member 543 and the second pitch coil 548p in the optical axis direction. In order to provide a space where the second pitch magnet 549p is disposed between the base member 543 and the second pitch coil 548p, arm portions 543g extending in the optical axis direction from the base member 543 are formed and hold at their tips the second pitch coil 548p. With the same manner, the first yaw magnet 547y is disposed between the base member 543 and the first yaw coil 546y in the optical axis direction.

Although the description of this embodiment will be continued below, the configurations of the optical image stabilizer 500 in the pitch and yaw directions are identical to each other, so that the description will be made of the configuration in the pitch direction.

In this embodiment, in order to reduce a thickness of the optical image stabilizer 500 in its thickness direction (optical axis direction), the second pitch magnet 549p is disposed between the base member 543 and the second pitch coil 548p. This configuration enables disposing the first pitch coil 546p and the second pitch magnet 549p on an approximately identical plane orthogonal to an optical axis Oa. Furthermore, this configuration enables disposing the second pitch coil 548p and the first pitch magnet 547p on an approximately identical plane orthogonal to the optical axis Oa.

However, in order to simplify a shape of the movable member 542, it is not necessary that the first pitch coil 546p and the second pitch magnet 549p be disposed on the approximately identical plane orthogonal to the optical axis Oa. Similarly, it is not necessary that the second pitch coil 548p and the first pitch magnet 547p be disposed on the approximately identical plane orthogonal to the optical axis Oa. Moreover, another configuration may be employed that the first and second pitch coils 546p and 548p are held by the movable member 542, the first and second pitch magnets 547p and 549p are held by the base member 543.

As described above, this embodiment is different from Embodiment 1 in that one pitch magnet of the first and second pitch magnets 547p and 549p is disposed between one pitch coil facing the one pitch magnet and the base member 543.

Next, with referring to FIGS. 15A and 15B, description will be made of a difference between a force generation state near the end position of the movable range in Embodiment 1 and that in this embodiment.

Figure 15A:
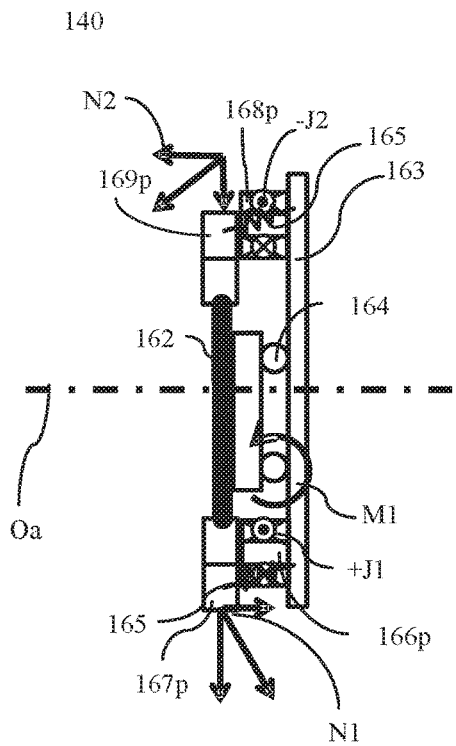
FIGS. 15A and 15B are sectional views illustrating a modified example of the operation of the optical image stabilizer of Embodiment 4.

FIG. 15A illustrates a model indicating a state where, in Embodiment 1, the movable member 142 has reached a first pitch coil (146p) side end position of the movable range. This model is constituted by a movable member 162 having a simplified shape compared to that of the movable member 142, a base member 163, balls 164, tension springs 165, a first coil 166p, a first magnet 167p, a second coil 168p and a second magnet 169p.

In a state where the movable member 162 has reached the first pitch coil side end position, extension amounts of the tension springs 165 biasing the movable member 162 and the base member 163 are large, and thereby a shift resistance force generated by the tension springs 165 is large. A shift direction component of the shift resistance force acts in a direction opposite to that of a thrust force generated by the coil and magnet. Therefore, in order to shift the movable member 162 to a target position, it is necessary to increase the thrust force generated by the coil and magnet. Since increasing the electric current applied to the coil in order to increase the thrust force increases an out-of-plane force, in the state where the movable member 162 has reached the end position of the movable range, large out-of-plane forces N1 and N2 are generated by energization of the first and second coils 166p and 168p. The out-of-plane forces N1 and N2 generated by the energization of the first and second coils 166p and 168p act in mutually opposite directions. In addition, since the balls 164 are disposed near the optical axis Oa in order to reduce a diameter of the optical image stabilizer 500, the out-of-plane forces N1 and N2 generates a large moment M1 about the ball 164 in the movable member 162.

This moment M1 may cause a ball non-contact state where the movable member 162 and any one of the balls 164 do not contact each other.

Figure 15B:
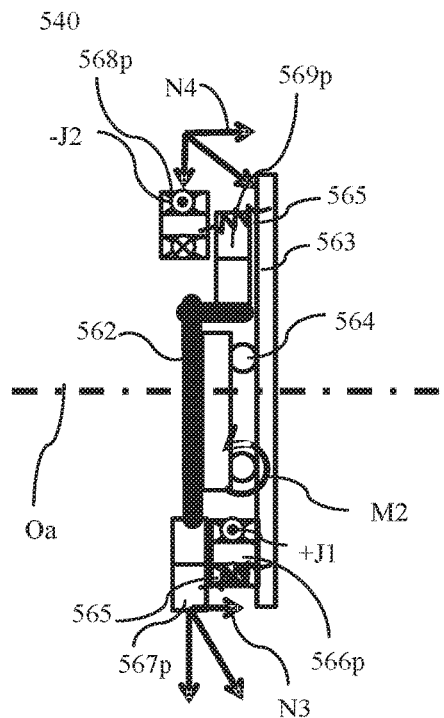

FIG. 15B illustrates a model indicating a state where, in this embodiment, the movable member 542 has reached a first pitch coil (546*p*) side end position of the movable range. This model is constituted by a movable member 562 having a simplified shape compared to that of the movable member 542, a base member 563, balls 564, tension springs 565, a first coil 566*p*, a first magnet 567*p*, a second coil 568*p* and a second magnet 569*p*.

As well as in FIG. 15A, in the state where the movable member 562 has reached the end position of the movable range, a shift resistance force generated by the tension springs 565 increases, and thereby large out-of-plane forces N3 and N4 are generated respectively at the first and second magnets 567*p* and 569*p*. However, in this embodiment, the out-of-plane forces N3 and N4 generated at the first and second magnets 567*p* and 569*p* act in the same direction. Therefore, a moment M2 generated by the out-of-plane forces N3 and N4 about the ball 564 is smaller than in Embodiment 1 because moments generated respectively by the out-of-plane forces N3 and N4 are canceled each other out. As a result, the above-described ball non-contact state can be prevented from being generated.

Although this description is made of the state where the movable member has reached a one side end position of the movable range, in a state where the movable member has reached another side end position of the movable range the thrust force and the out-of-plane forces act respectively in inverse directions. In this state, an out-of-plane force is generated that causes the ball 564 not to contact the movable member 562 against the tension springs 565. However, setting spring forces of the tension springs 565 sufficiently large with respect to the out-of-plane force enables preventing the generation of the ball non-contact state.

As another method for preventing the generation of the ball non-contact state, the tension springs and the balls may be disposed far away from the center O of the optical element. However, this configuration increases the diameter of the optical image stabilizer. Thus, when it is necessary to prevent the generation of the ball non-contact state, in order to reduce the increase in diameter of the optical image stabilizer, it is desirable to employ the method described in this embodiment.

In this embodiment, operations of a corrector, a positional difference amount (d) of each coil center with respect to the magnetization boundary of each magnet and control of the optical image stabilizer 500 are the same as those in Embodiment 1.

Figure 16A:
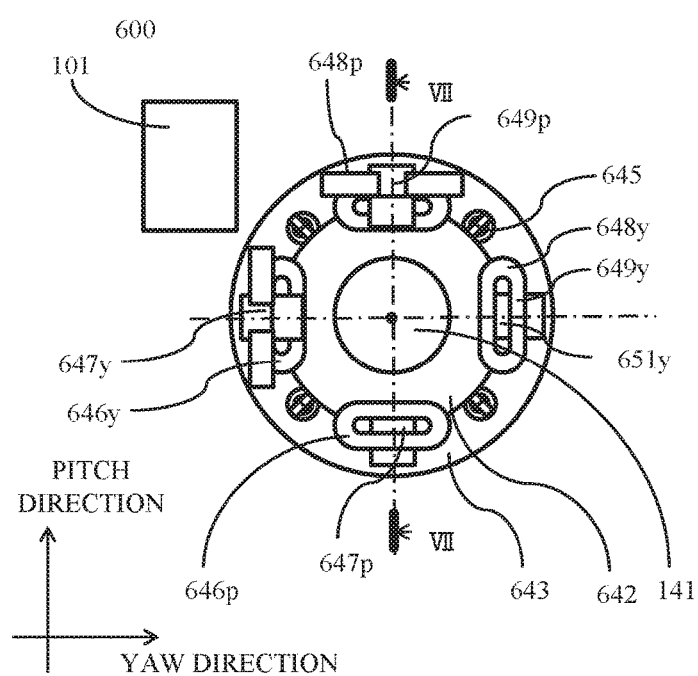
FIGS. 16A and 16B are a front view and a sectional view of an optical image stabilizer as a modified example of Embodiment 4.
Figure 16B:
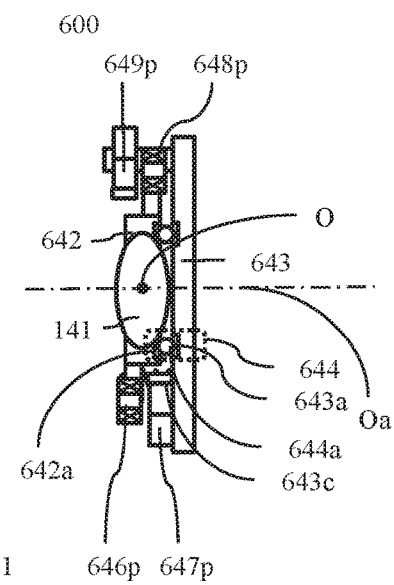

Although FIGS. 14A and 14B illustrate a moving magnet type optical image stabilizer 500 in which each magnet is held by the movable member 542 and each coil is held by the base member 543, a moving coil type optical image stabilizer 600 illustrated in FIGS. 16A and 16B, which is the same type as the optical image stabilizer 200 of Embodiment 2 in which each coil is held by the movable member and each magnet is held by the base member, may be employed. FIG. 16A illustrates a configuration of the optical image stabilizer 600 when viewed from an optical axis direction, and FIG. 16B illustrates a section thereof along a VII-VII line in FIG. 16A (that is, a section when viewed from a yaw direction).

FIGS. 16A and 16B illustrate a neutral state (first state) where a movable member 642 is located at a center of its movable range. A center of the first pitch coil 646*p* (first pitch coil center) has a positional difference from a magnetization boundary of a first pitch magnet 647*p* to an inside in the pitch direction by a predetermined positional difference amount. Furthermore, a center of a second pitch coil 648*p* (second pitch coil center) has a positional difference from a magnetization boundary of a second pitch magnet 649*p* to an inside in the pitch direction by the above predetermined positional difference amount. Furthermore, in order to reduce a thickness of the optical image stabilizer 600 in its thickness direction (optical axis direction), the second pitch coil 648*p* is disposed between the base member 643 and the second pitch magnet 649*p*.

In this embodiment, each of the optical image stabilizers 500 and 600 using a VCM as an actuator enables reducing an increase in its diameter while providing a large maximum shiftable amount. Moreover, each of the optical image stabilizers 500 and 600 enables reducing the moment acting on the movable member and thereby preventing the generation of the ball non-contact state.

[Embodiment 5]

Next, description will be made of an optical image stabilizer 700 that is a fifth embodiment (Embodiment 5) of the present invention. In this embodiment, constituent elements common to those in Embodiment 1 are denoted by the same reference numerals as those in Embodiment 1, and their description will be omitted. In this embodiment, description will be mainly made of differences from Embodiment 1.

FIGS. 17A and 17B illustrate a configuration of the optical image stabilizer 700. FIG. 17A illustrates a configuration of the optical image stabilizer 700 when viewed from an optical axis direction, and FIG. 17B illustrates a section thereof along a VIII-VIII line in FIG. 17A (that is, a section when viewed from a yaw direction). FIGS. 17A and 17B illustrate a neutral state (first state) where a movable member 742 is located at a center of its movable range. In this embodiment, a first pitch magnet 747*p* and a second pitch coil 748*p* are held by the movable member 742, and a first pitch coil 746*p* and a second pitch magnet 749*p* are held by a base member 743. In the pitch direction, an optical element 141 is disposed between the first and second pitch magnets 747*p* and 749*p* (that is, between the first and second pitch coils 746*p* and 748*p*). In the neutral state, a center of the first pitch coil 746*p* (first pitch coil center) has a positional difference from a magnetization boundary of the first pitch magnet 747*p* to an outside in the pitch direction by a predetermined positional difference amount. On the other hand, a center of the second pitch coil 748*p* (second pitch coil center) has a positional difference from a magnetization boundary of the second pitch magnet 749*p* to an inside in the pitch direction by the predetermined positional difference amount. In other words, the first and second pitch coil centers have positional differences to mutually different sides of the outside and inside in the pitch direction from the magnetization boundaries 747*pb* and 749*pb* of the first and second pitch magnets 747*p* and 749*p*. This also applies to first and second yaw coils 746*y* and 748*y* and first and second yaw magnets 747*y* and 749*y*. Furthermore, in this embodiment, the second pitch coil 748*p* is disposed between the base member 743 and the second pitch magnet 749*p* in the optical axis direction. In order to provide a space where the second pitch coil 748*p* is disposed between the base member 743 and the second pitch magnet 749*p*, arm portions 743*g* extending in the optical axis direction from the base member 743 are formed and hold at their tips the second pitch magnet 749*p*. With the same manner, the first yaw coil 747*y* is disposed between the base member 743 and the first yaw magnet 747*y* in the optical axis direction.

Although the description of this embodiment will be continued below, the configurations of the optical image stabilizer 700 in the pitch and yaw directions are identical to each other, so that the description will be made of the configuration in the pitch direction.

In this embodiment, in order to reduce a thickness of the optical image stabilizer 700 in its thickness direction (optical axis direction), the second pitch coil 748p is disposed between the base member 743 and the second pitch magnet 749p. This configuration enables disposing the first pitch coil 746p and the second pitch coil 748p on an approximately identical plane orthogonal to an optical axis Oa. Furthermore, this configuration enables disposing the first pitch magnet 747p and the second pitch magnet 749p on an approximately identical plane orthogonal to the optical axis Oa. However, in order to simplify a shape of the movable member 742, it is not necessary that the first pitch coil 746p and the second pitch coil 748p be disposed on the approximately identical plane orthogonal to the optical axis Oa. Similarly, it is not necessary that the first pitch magnet 747p and the second pitch magnet 749p be disposed on the approximately identical plane orthogonal to the optical axis Oa. Moreover, another configuration may be employed that the first pitch magnet 747p and the second pitch coil 748p are held by the base member 743, and the first pitch coil 746p and the second pitch magnet 749p are held by the movable member 742.

As described above, this embodiment is different from Embodiment 1 in that one and the other of the first and second pitch coils 746p and 748p are held by mutually different ones of the base member 743 and the movable member 742 and in that one and the other of the first and second pitch magnets 747p and 749p are held by mutually different ones of the base member 743 and the movable member 742. Moreover, this embodiment is different from Embodiment 1 in that, as described above, in the pitch direction, the first and second pitch coil centers have positional differences to mutually different sides of the outside and inside from the magnetization boundaries 747pb and 749pb of the first and second pitch magnets 747p and 749p.

Next, with referring to FIGS. 18A and 18B, description will be made of a difference between a force generation state near the end position of the movable range in Embodiment 1 and that in this embodiment.

FIG. 18A illustrates the same model as that illustrated in FIG. 15A. FIG. 18B illustrates a model indicating a state where, in this embodiment, the movable member 742 has reached a first pitch coil (746p) side end position of the movable range. This model is constituted by a movable member 762 having a simplified shape compared to that of the movable member 742, a base member 763, balls 764, tension springs 765, a first coil 766p, a first magnet 767p, a second coil 768p and a second magnet 769p.

In FIG. 18A, the first coil 166p is energized with an electric current flowing in a +J1 direction and the second coil 168p is energized with an electric current flowing in a −J2 direction, and thereby a thrust force is generated. However, in FIG. 18B, the members holding the second coil 768p and the second magnet 769p are switched, and thereby a thrust force generated therebetween acts in an opposite direction to that in FIG. 18A. Thus, in order to change the direction in which the thrust force generated between the second magnet 769p and the second coil 768p to the same direction as that of the thrust force generated between the first magnet 767p and the first coil 766p, the second coil 768p is energized with an electric current flowing in a +J2 direction. Therefore, as well as in FIG. 15B, a moment M2 generated by out-of-plane forces N3 and N4 about the ball 764 is smaller than in Embodiment 1 because moments generated respectively by the out-of-plane forces N3 and N4 are canceled each other out. As a result, the above-described ball non-contact state can be prevented from being generated. In a state where the movable member 762 has reached another side end position of the movable range, the thrust force and the out-of-plane forces act respectively in inverse directions, as well as in Embodiment 4.

In this embodiment, operations of a corrector, a positional difference amount (d) of each coil center with respect to the magnetization boundary of each magnet and control of the optical image stabilizer 700 are the same as those in Embodiment 1.

In this embodiment, in the neutral state, the first and second pitch coil centers may have positional differences to the same side of the outside and inside in the pitch direction from the magnetization boundaries of the first and second pitch magnets.

In this embodiment, the optical image stabilizer 700 using a VCM as an actuator enables reducing an increase in its diameter while providing a large maximum shiftable amount. Moreover, the optical image stabilizer 700 enables reducing the moment acting on the movable member and thereby preventing the generation of the ball non-contact state.

[Embodiment 6]

Next, description will be made of an optical image stabilizer 800 that is a sixth embodiment (Embodiment 6) of the present invention. In this embodiment, constituent elements common to those in Embodiment 1 are denoted by the same reference numerals as those in Embodiment 1, and their description will be omitted. In this embodiment, description will be mainly made of differences from Embodiment 1.

Figures 19A, 19B:
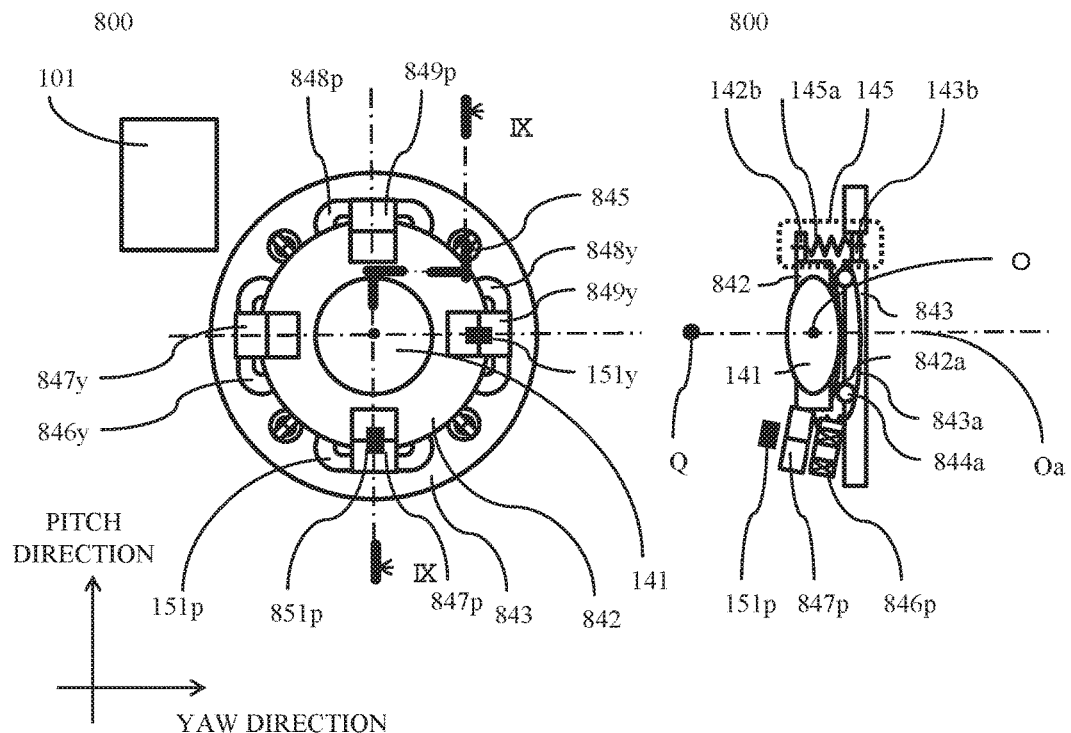
FIGS. 19A and 19B are a front view and a sectional view of an optical image stabilizer that is Embodiment 6 of the present invention.

FIGS. 19A and 19B illustrate a configuration of the optical image stabilizer 800. FIG. 19A illustrates a configuration of the optical image stabilizer 800 when viewed from an optical axis direction, and FIG. 19B illustrates a section thereof along a IX-IX line in FIG. 19A (that is, a section when viewed from a yaw direction). In addition, FIGS. 19A and 19B illustrate a neutral state (first state) where a movable member 842 is located at a center of its movable range.

In this embodiment, coils 846p, 848p, 846y and 848y are held by a base member 843, and magnets 847p, 849p, 847y and 849y are held by the movable member 842. Furthermore, in this embodiment, in a pitch direction, an optical element 141 is disposed between the first and second pitch magnets 847p and 849p (that is, between the first and second pitch coils 846p and 848p). This also applies to the yaw direction.

Moreover, in the neutral state, a center of the first pitch coil 846p (first pitch coil center) has a positional difference from a magnetization boundary of the first pitch magnet 847p to an outside in the pitch direction by a predetermined positional difference amount. A center of a second pitch coil 848p (second pitch coil center) has a positional difference from a magnetization boundary of the second pitch magnet 849p to an outside in the pitch direction by the above predetermined positional difference amount. In other words, the first and second pitch coil centers have positional differences to the same side (outside in this embodiment) of the outside and inside in the pitch direction from the magnetization boundaries of the first and second pitch magnets 847p and 849p. This also applies to first and second yaw coils 846y and 848y and first and second yaw magnets 847y and 849y.

In this embodiment, ball-receiving portions 842a and 843a formed in the movable member 842 and the base member 843 respectively have a convex spherical surface shape and a concave spherical surface shape. Balls 844a roll on these spherical surfaces. Furthermore, the first and second pitch coils 846p and 848p, the first and second pitch magnets 847p and 849p and a pitch detection element 151p are held with a tilt of a predetermined angel with respect to a shift plane orthogonal to an optical axis Oa. The magnet and coil held with the tilt generate a thrust force to shift the movable member 842 on a spherical surface centering a point Q.

In this embodiment, operations of a corrector, a positional difference amount (d) of each coil center with respect to the magnetization boundary of each magnet and control of the optical image stabilizer 800 are the same as those in Embodiment 1.

Although this embodiment described a moving magnet type optical image stabilizer 800 in which each magnet is held by the movable member 842 and each coil is held by the base member 843, a moving coil type optical image stabilizer in which each coil is held by the movable member and each magnet is held by the base member may be employed.

Furthermore, both the centers of the coils may have positional differences to the inside from the magnetization boundaries of the magnets.

Moreover, as well as in Embodiment 4, between the base member and one coil held by the base member, a magnet facing that coil and held by the movable member may be disposed.

In addition, as well as in Embodiment 5, one and the other of the coils may be held by mutually different ones of the base member and the movable member, and one and the other of the magnets are held by mutually different ones of the base member and the movable member.

In this embodiment, the optical image stabilizer 800 using a VCM as an actuator enables reducing an increase in its diameter while providing a large maximum shiftable amount.

[Embodiment 7]

Figure 20:
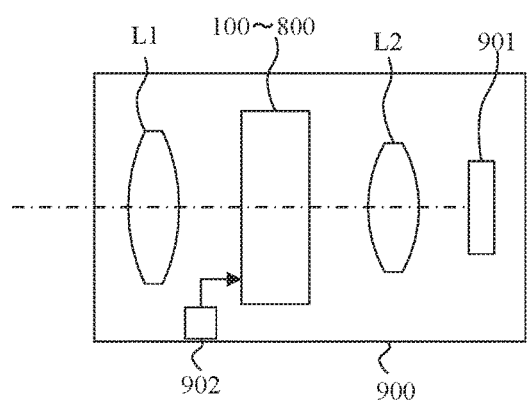
FIG. 20 illustrates an optical apparatus provided with the optical image stabilizer of one of Embodiments 1 to 6.

FIG. 20 illustrates a digital camera (image capturing apparatus) 900 as an optical apparatus provided with the optical image stabilizer of any one of Embodiments 1 to 6. The optical apparatus may be other apparatuses than the digital camera, such as an interchangeable lens.

In FIG. 20, reference character L1 and L2 denote lenses constituting an image capturing optical system. The optical image stabilizer (100 to 800) is disposed in this image capturing optical system. The image capturing optical system forms an object image (optical image). Reference numeral 901 denotes an image sensor such as a CCD sensor or a CMOS sensor. The image sensor 901 photoelectrically converts the object image to produce a captured image.

Reference numeral 902 denotes a shake sensor such as a gyro sensor. The shake sensor 902 detects shaking of the camera 900 to output an electric signal (shake detection signal) to the electrical substrate 101 in the optical image stabilizer (100 to 800). The comparator 110 and the calculator 120 included in the electrical substrate 101 controls the optical image stabilizer (100 to 800), as described in Embodiment 1, depending on the target position calculated using the shake detection signal.

Although each of Embodiments 1 to 7 described the optical image stabilizer, the shift mechanism described in each of Embodiments 1 to 6 may be used for other apparatuses than the optical image stabilizer.

Each of Embodiments 1 to 7 can achieve an optical apparatus using a VCM as an actuator that provides a large movable amount of a movable member (that is, a large shiftable amount of a shiftable member) while reducing an increase in size of the apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-209665, filed on Oct. 26, 2015, which is hereby incorporated by reference herein in its entirety.

What is claimed is:

1. An optical apparatus comprising:
a base member;
a movable member holding a first element that is an optical element or an image sensor and being movable with respect to the base member in a first direction;
a first actuator including a first coil and a first magnet, the first coil being provided to a first member that is one of the base and movable members, the first magnet being provided to a second member that is another one of the base and movable members, the first coil and the first magnet facing each other in a second direction orthogonal to the first direction; and
a second actuator including a second coil and a second magnet, the second coil being provided to one of the first and second members, the second magnet being provided to another one of the first and second members, the second coil and the second magnet facing each other in the second direction, wherein:
the first element is disposed between the first and second actuators;
the first magnet has a first surface facing the first coil, and the second magnet has a second surface facing the second coil, each of the first and second surfaces having thereon an N-pole portion and an S-pole portion arranged in the first direction;
the first and second actuators are configured to move the movable member in the first direction; and
in a first state where the movable member is located at a center of its movable range in the first direction, a center position of the first coil has a difference from a boundary position of the N-pole and S-pole portions of the first magnet in the first direction, and a center position of the second coil has a difference from a boundary position of the N-pole and S-pole portions of the second magnet in the first direction.

2. An optical apparatus according to claim 1, wherein: the second coil is provided to the first member; the second magnet is provided to the second member; and in the first state the center positions of the first and second coils have the differences to a side close to the first element in the first direction.

3. An optical apparatus according to claim 1, wherein: the second coil is provided to the first member, be the second magnet is provided to the second member; and in the first state the center positions of the first and second coils have the differences to a side away from the first element in the first direction.

4. An optical apparatus according to claim 1, wherein: the second coil provided to the second member; the second magnet is provided to the first member; and in the first state one of the center positions of the first and second coils have the difference a side close to the first element in the first direction, and another one of the center positions of the first and, second coils has the difference to a side away from the first element in the first direction.

5. An optical apparatus according to claim 1, wherein in the first state the first and second coils have the differences of mutually equal difference amounts.

6. An optical apparatus according to claim 1, wherein in the first state a first force generated between the energized first coil and the N-pole portion of the first magnet and a second force generated between the energized first coil and the S-pole portion of the first magnet are not in balance with each other.

7. An optical apparatus according to claim 1, further comprising a biasing member biasing the movable member in a second state where the movable member is moved from the first state, toward the center of the movable range in the first direction.

* * * * *